579-304 EX
E4819 OR RE 23,056
Examin

Dec. 7, 1948. J. H. VOSS Re. 23,056

Orig. 2,431,850

RELAY AUTOMATIC TELEPHONE SYSTEM

Original Filed Dec. 12, 1945 10 Sheets-Sheet 1

INVENTOR.
JOHN H. VOSS

BY Chas. L. Candy

ATTORNEY

Dec. 7, 1948. J. H. VOSS Re. 23,056

RELAY AUTOMATIC TELEPHONE SYSTEM

Original Filed Dec. 12, 1945 10 Sheets-Sheet 2

INVENTOR.
JOHN H. VOSS

BY

ATTORNEY

Dec. 7, 1948. J. H. VOSS Re. 23,056

RELAY AUTOMATIC TELEPHONE SYSTEM

Original Filed Dec. 12, 1945 10 Sheets-Sheet 3

INVENTOR.
JOHN H. VOSS
BY Chas. Tu. Comly
ATTORNEY

Examin

Dec. 7, 1948. J. H. VOSS Re. 23,056

RELAY AUTOMATIC TELEPHONE SYSTEM

Original Filed Dec. 12, 1945 10 Sheets-Sheet 4

INVENTOR.
JOHN H. VOSS

BY

ATTORNEY

Dec. 7, 1948. J. H. VOSS Re. 23,056

RELAY AUTOMATIC TELEPHONE SYSTEM

Original Filed Dec. 12, 1945 10 Sheets-Sheet 5

INVENTOR.
JOHN H. VOSS

BY

ATTORNEY

Examiner

Dec. 7, 1948. J. H. VOSS Re. 23,056

RELAY AUTOMATIC TELEPHONE SYSTEM

Original Filed Dec. 12, 1945 10 Sheets-Sheet 6

INVENTOR.
JOHN H. VOSS

BY

ATTORNEY

RELAY AUTOMATIC TELEPHONE SYSTEM

Original Filed Dec. 12, 1945 10 Sheets-Sheet 7

INVENTOR.
JOHN H. VOSS

BY Chas. Ta. Candy

ATTORNEY

Examin

Dec. 7, 1948. J. H. VOSS Re. 23,056

RELAY AUTOMATIC TELEPHONE SYSTEM

Original Filed Dec. 12, 1945 10 Sheets-Sheet 8

INVENTOR.
JOHN H. VOSS

BY

ATTORNEY

RELAY AUTOMATIC TELEPHONE SYSTEM

Original Filed Dec. 12, 1945 10 Sheets-Sheet 9

INVENTOR.
JOHN H. VOSS

BY

ATTORNEY

RELAY AUTOMATIC TELEPHONE SYSTEM
Original Filed Dec. 12. 1945 10 Sheets-Sheet 10
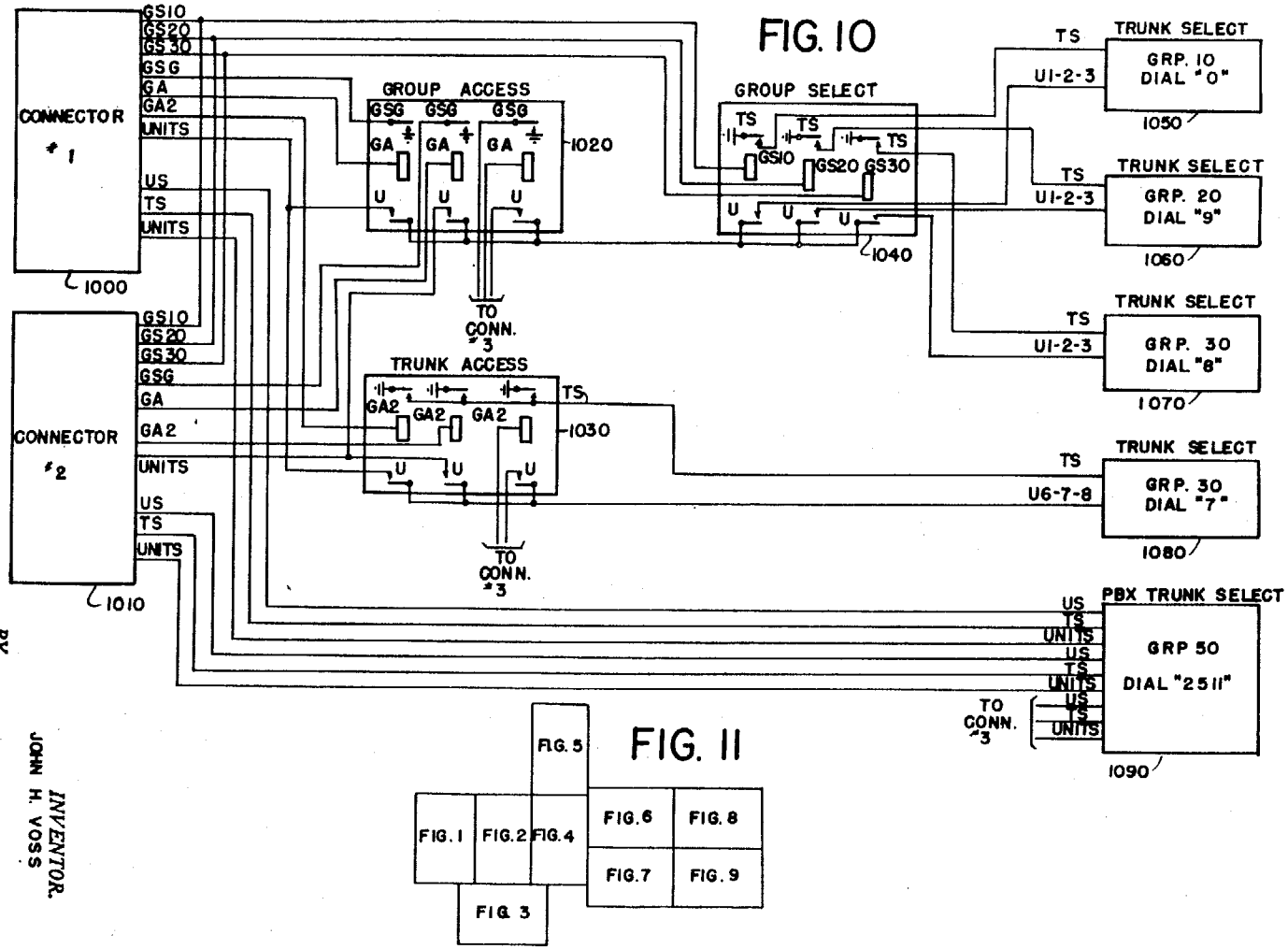
INVENTOR.
JOHN H. VOSS
BY Chas. H. Condy
ATTORNEY Examiner Reissued Dec. 7, 1948

Re. 23,056

UNITED STATES PATENT OFFICE 23,056

RELAY AUTOMATIC TELEPHONE SYSTEM

John H. Voss, Rochester, N. Y., assignor to Automatic Electric Laboratories, Inc., Chicago, Ill., a corporation of Delaware Original No. 2,431,850, dated December 2, 1947, Serial No. 634,555, December 12, 1945. Application for reissue July 1, 1948, Serial No. 36,387

19 Claims. (Cl. 179—18)

Figure 1:
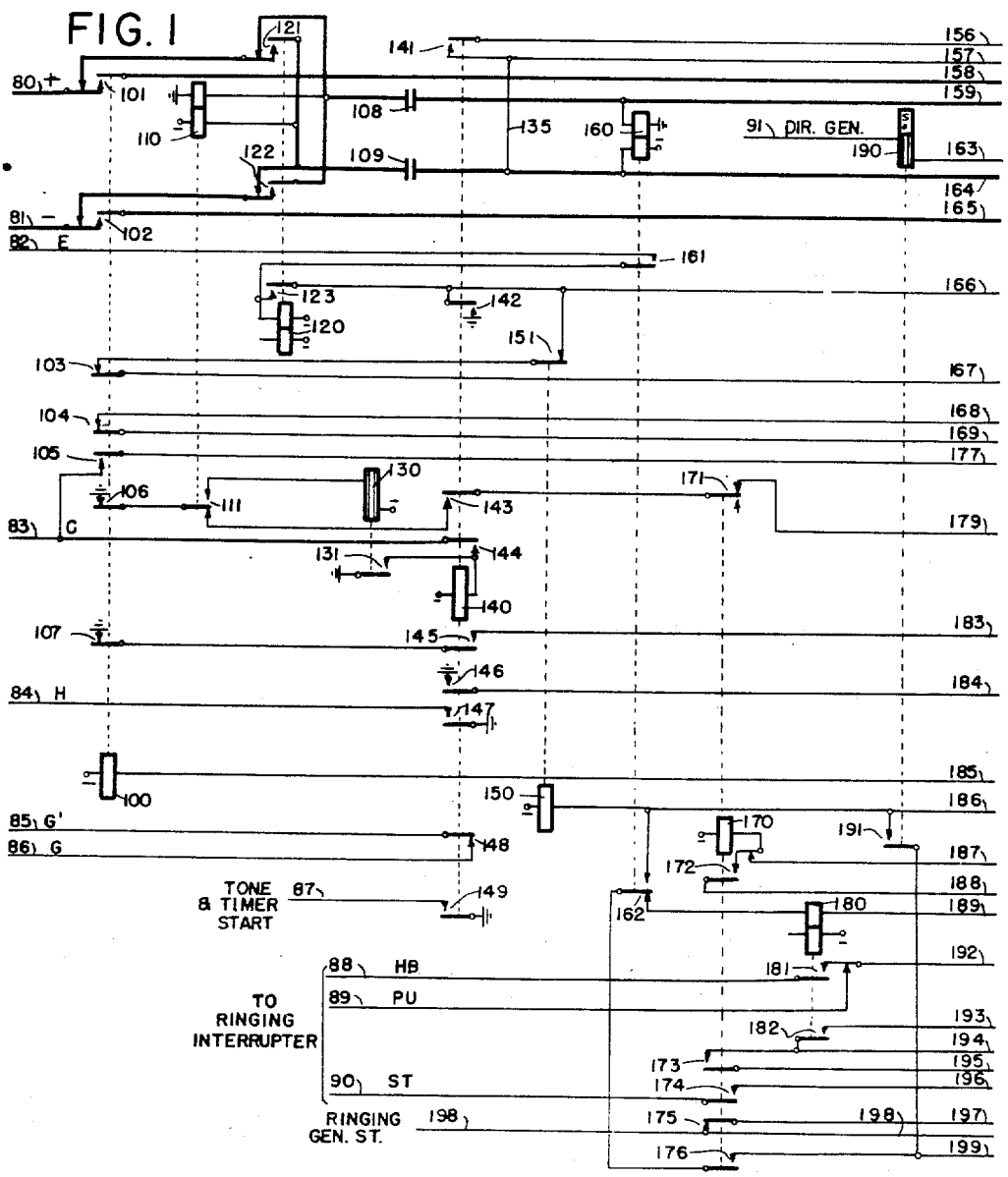

The present invention relates in general to telephone systems, but more particularly to small community automatic exchanges or C. A. X's of the all relay type, generally similar to that described in Patent No. 2,333,039, issued October 26, 1943, to Edward S. Peterson.

An automatic telephone system of this type must be low in cost, and yet must provide most of the services provided with a larger system, plus some additional. It usually has a capacity of less than 200 lines, and should be sufficiently flexible to permit adding or changing lines or services with a minimum of disturbance. For reasons of economy, many of the lines in such a system will be multi-party lines, and as likely as not, code ringing will be employed for signalling, particularly with the smaller switchboards.

Such an exchange will usually not have any toll operator, but must provide means whereby any subscriber can get access to an idle trunk leading to a toll operator at some nearby exchange, easily and quickly. Means must also be provided whereby a special subscriber, or a local or distant operator, may have easy access to groups of direct trunks to certain other exchanges. Provision must also often be made for additional trunk groups leading to one or more private branch exchanges or P. B. X's, in the community.

It is the main object of the present invention to provide improved means for automatically selecting idle toll, inter-office or P. B. X trunks in an all relay system of the character described, without any sacrifice of speed, convenience or flexibility. Speed is obtained by the pre-selection of idle trunks, in all cases. Convenience is achieved through the use of single-digit call numbers for all toll and inter-office trunks, with four-digit call numbers used in all other cases. Finally, flexibility is obtained through provisions permitting the assignment of trunks and subscribers' lines to any tens group, under normal circumstances.

Another object of the invention is to provide separate points of access for light traffic and heavy traffic trunk groups, thereby to permit calls to both classes of trunk to proceed simultaneously, and independently of each other.

A further object of the invention is to provide a separate point of access for P. B. X trunks, so as to permit calls to such trunks to proceed simultaneously with calls to other classes of trunks, without delay or interference between them.

Still another object of the invention is to provide means whereby two trunk groups may be assigned in the same tens group, thus avoiding in certain cases, the use of more tens relays than are actually required, in the links.

Other objects and features of the invention will be apparent from the specification and claims following, considered in conjunction with the accompanying drawings comprising Figs. 1 to 11, which show one embodiment of the invention as applied to a 100 line all relay system of the type described. It should be understood that the arrangement illustrated is merely one embodiment of the invention and not necessarily the preferred embodiment, and that numerous modifications and rearrangements thereof are possible, without departing from the spirit or scope of the invention as disclosed.

Referring to the drawings, Figs. 1 to 5 inclusive, when arranged as indicated in Fig. 11, with adjoining lines abutting, represent the essential parts of one of the connectors employed in the all relay links of this system. For purposes of simplicity, various special features of this connector, such as restricted service, reverting call facilities, timing of "permanents" or shorted lines, and incompleted calls, and the timing of conversations, have been omitted. For similar reasons, the finder end of the link has also been omitted, together with the associated allotter or link selector, common control relays, and line circuit. These parts are not considered necessary to an understanding of the invention, and furthermore, are very similar to those disclosed in the Patent No. 2,333,039 issued to Edward S. Peterson, previously mentioned. The same 3-relay line circuit is employed, with the same cut-off and lockout relays in series, and provisions for disconnecting the line control or "C" lead through the finder from the associated control normal or "CN" lead to the connector terminals, whenever the line relay of the line circuit is operated, and for reconnecting them when the line relay is restored to normal. The finder is also identical, with the same arrangement of tens and units relays, and the units divided into the same two sub-groups 1 to 5 and 6 to 0, controlled by five units relays and one sub-group relay.

Figure 6:
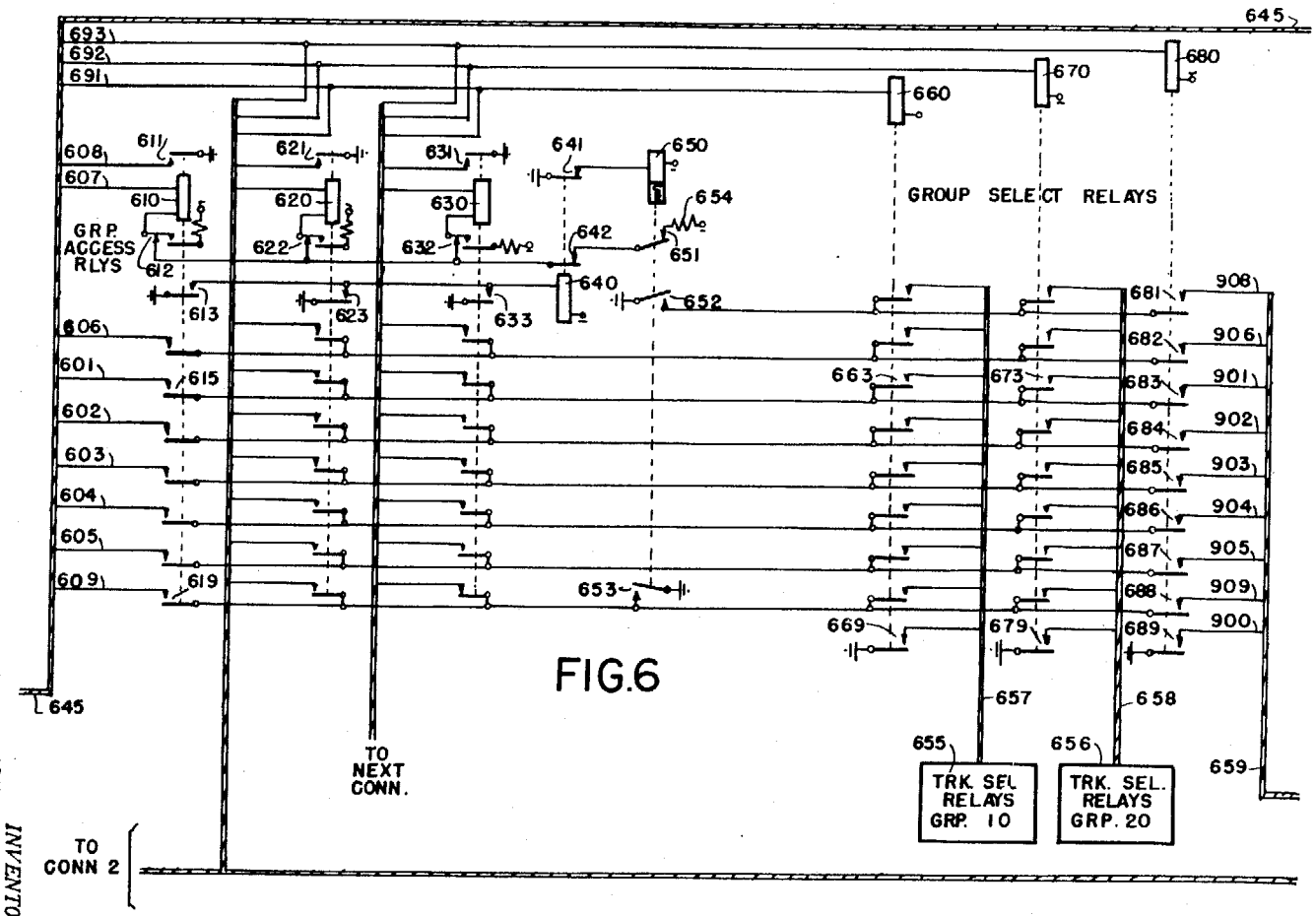
Figure 7:
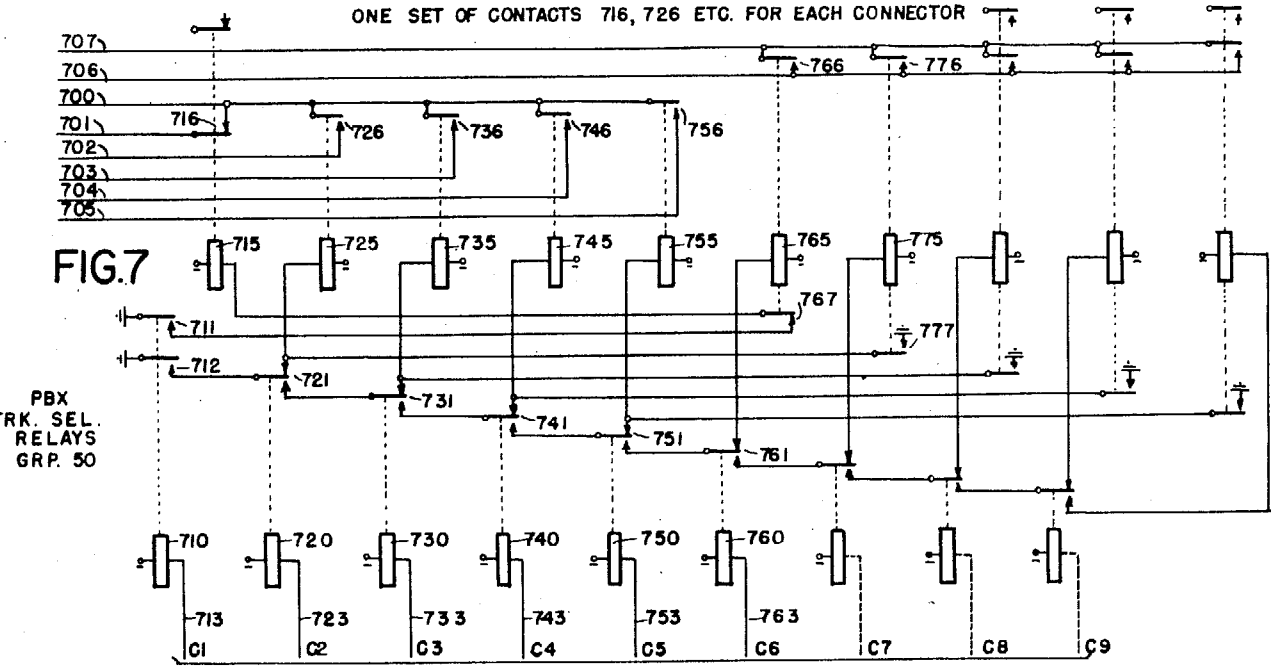
Figure 8:
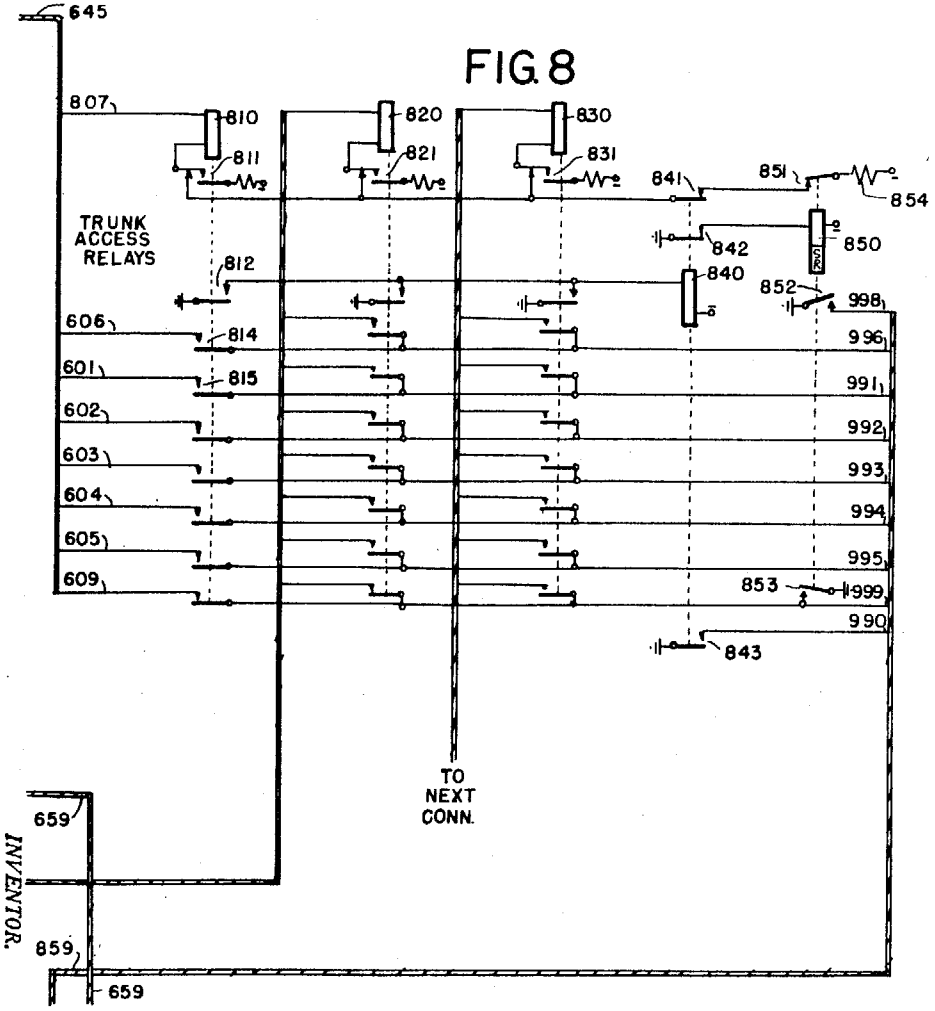

Figs. 6 to 8 inclusive, when likewise arranged as indicated in Figure 11, with respect to one another and the connector, represent the various types of additional equipment required to provide the automatic trunk selecting features already mentioned. In Fig. 6, for example, the relays on the left of the sheet are the "Group access relays," whose function is to pass trunk calls from the connectors to the proper trunk groups, in regular order, by way of the "Group select relays" on the right of the same sheet. The operation of one of the group select relays, in conjunction with an operated one of the group access relays, extends the units conductors and the busy conductor of the connector, through to the proper group of "Trunk select relays" such as indicated by the rectangles 655 and 656, or such as shown in the upper part of Fig. 9.

Fig. 7 shows a group of "P. B. X trunk select relays" whose function it is to pre-select the next idle trunk in the associated P. B. X trunk group, by preparing, in advance, a circuit to the connector units relay or relays corresponding to said next idle trunk. This circuit becomes effective immediately whenever these relays are seized by a connector. The P. B. X select relays are reached directly from the connector, no intervening group access or group select relays being provided. For this reason, the select relays of this group require separate sets of units-controlling contact springs for each connector.

Fig. 8 shows a separate group of "Trunk access relays" associated with a second group of trunks in the same tens group, in this case, group 30. The function of these relays is to pass trunk calls from the connectors to the associated trunk group by way of a separate set of trunk select relays, such as indicated in the lower part of Fig. 9, no intervening group select relays being employed. The operation of one of the trunk access relays therefore, extends the units conductors and the busy conductor of the connector direct to the trunk select relays involved.

Figure 9:
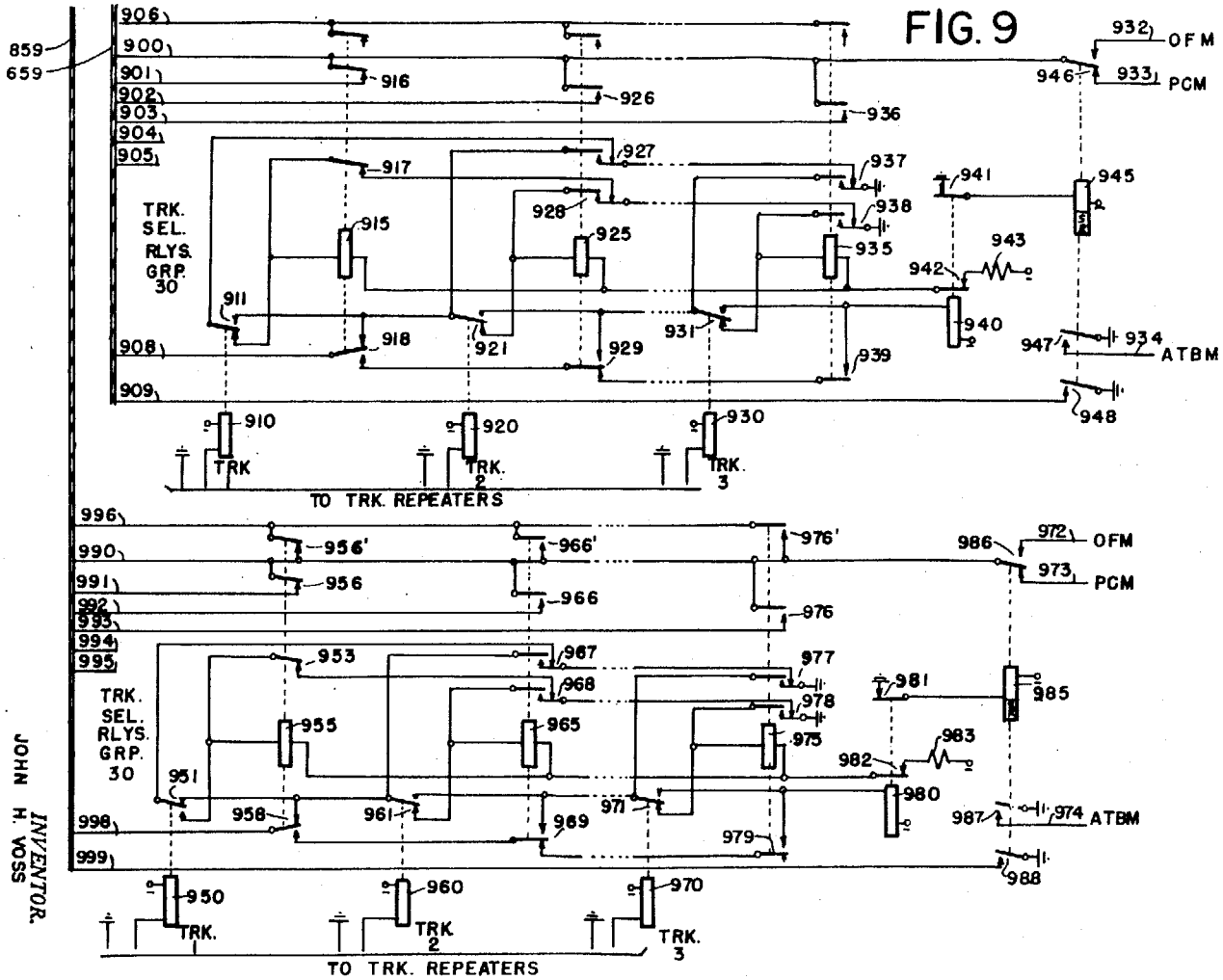

Fig. 9 shows the arrangement of the trunk select relays, two separate groups being indicated, both associated with the tens group 30. The function of these relays is to pre-select the next idle trunk in the associated trunk group. This they do by preparing, in advance, a circuit to the connector units-relay or relays corresponding to said next idle trunk. This circuit then becomes effective whenever the trunk select relays are seized by the group access and group select relays or by the trunk access relays.

Figure 2:
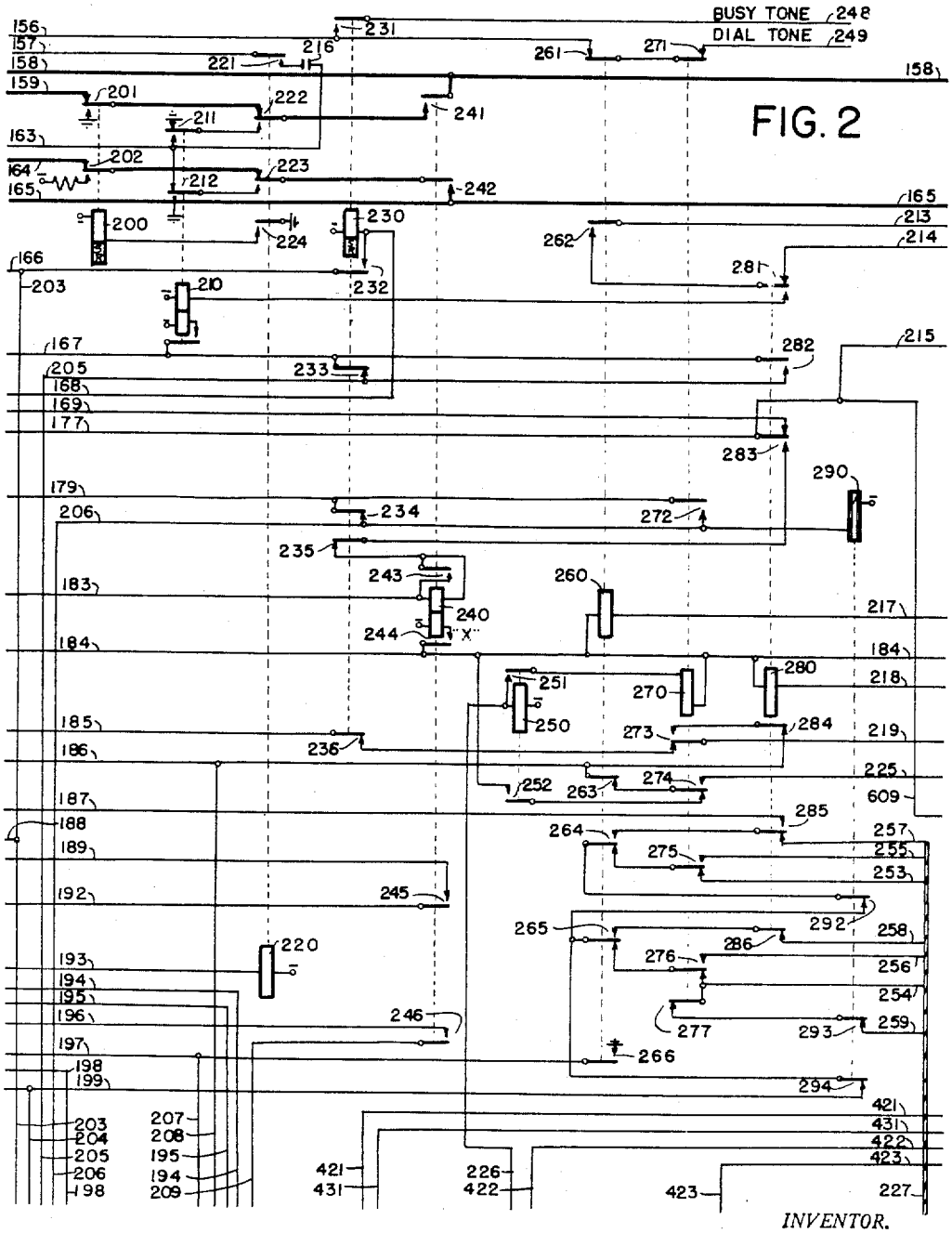
Figure 3:
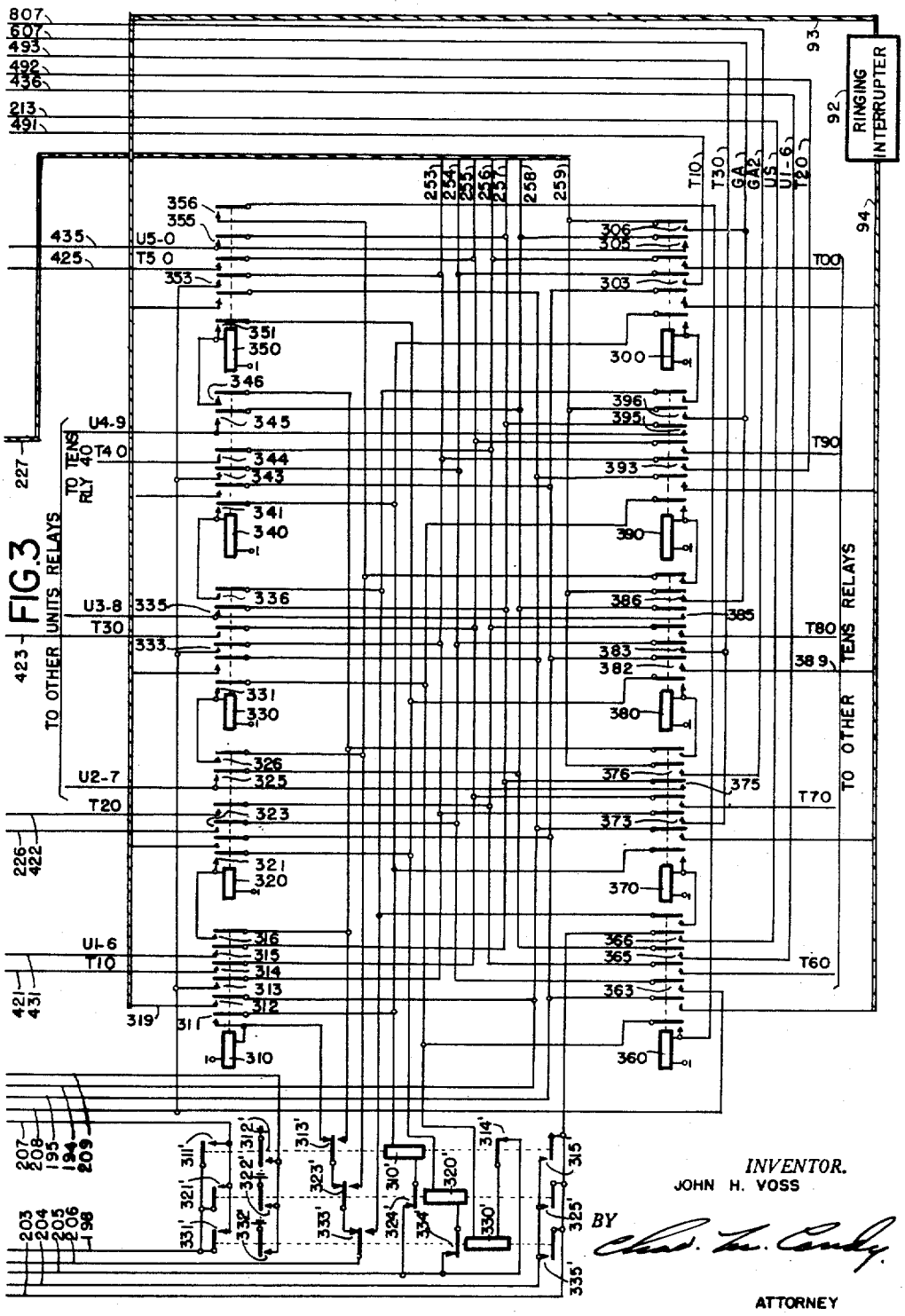
Figure 4:
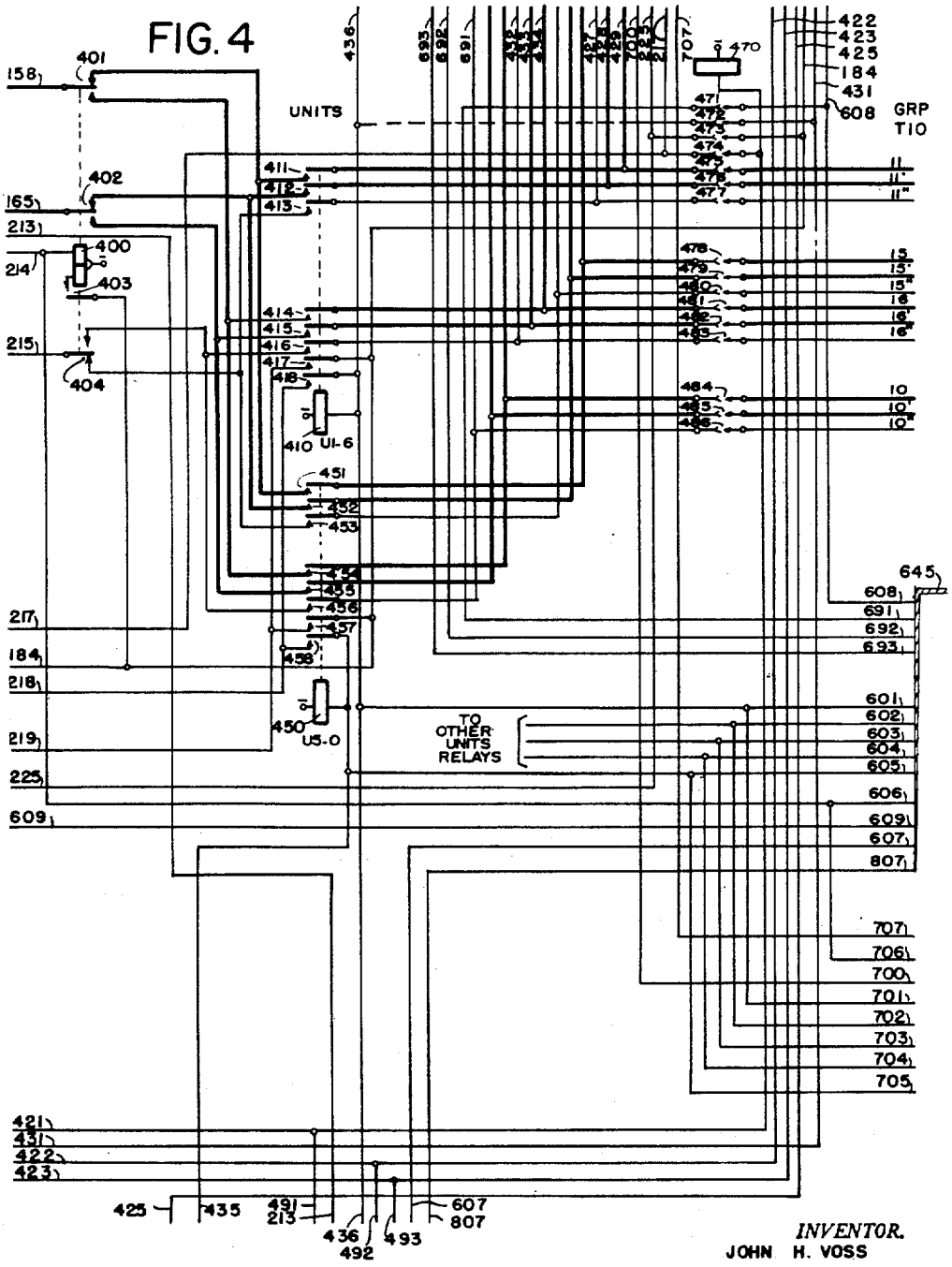

Fig. 10 shows a schematic layout of the Figs. 1 to 9 on a single sheet with circuit details omitted, and only the basic interconnections indicated in order to more clearly portray the relationships between the various figures. Thus the two rectangles 1000 to 1010 at the left represent two identical connectors such as shown in the Figs. 1 to 5 inclusive, while the two rectangles 1020 and 1030 immediately adjacent represent the Group access relays of Fig. 6 and the Trunk access relays of Fig. 8 respectively. The rectangle 1040 represents the Group select relays of Fig. 6; the rectangles 1050 and 1060 on the extreme right of the sheet represent the Trunk select relays indicated at 655 and 656 in Fig. 6; and the rectangle 1070 represents the group of trunk select relays shown in the upper half of Fig. 9. Rectangle 1080 on the other hand represents the Trunk select relays in the lower part of Fig. 9, and rectangle 1090 the P. B. X trunk select relays of Figure 7. With respect to the interconnections, the upper three leads at the connectors, marked GS10, GS20, GS30 are outgoing "group select" leads, and directly under these is an incoming "group select ground" lead marked GSG. Below this are two outgoing "group access" leads designated GA and GA2, and underneath this is an incoming "units" lead, which actually represents the five possible numerical units leads plus the units sub-group lead. Still below all of these are three additional leads to the P. B. X trunk select relays, including an outgoing "sub-group select" lead and a "P. B. X trunk select" lead designated US and TS respectively, and a second incoming "units" lead representing again a possible five units leads and a units sub-group lead. Both sets of units leads are multipled together inside of the connector, as shown in Fig. 4.

To continue the description of the equipment shown in the individual circuit drawings in somewhat greater detail, Fig. 1 shows the incoming end of a connector in one of the finder-connector links of this system. Conductors 80 and 81 at the upper left of this figure are the talking conductors from the finder, where of course, they may be connected as required to any calling line, and are so connected, almost instantly, upon the initiation of a call. Conductor 82 is a supervisory conductor from the finder, where it is grounded or not grounded on a call depending on the nature of the calling line, and whether or not reverse battery supervision is desired. Conductor 83 is the line control or "C" conductor to the finder where it is switched through to the line circuit of a calling line at the same time that the talking conductors are connected to the calling line. This conductor is grounded in the connector, immediately upon the seizure of this equipment by a call. Conductor 84 is the hold conductor which is also grounded in the connector immediately upon its seizure by a call, and serves to lock up the operated tens and units relays of the finder preparatory to the release of the allotter and the associated common equipment. Conductors 85 and 86 are locking conductors, which are opened in the connector upon its seizure to prepare the release of the associated link select relay in the allotter, thereby to permit pre-selection of the next idle link. The other, open ended conductors in this figure go to the tone and timer equipment, the ringing interrupter and the ringing generator as indicated. The ringing interrupter places negative battery on conductor 88 during each ringing cycle, and momentarily on conductor 89 just before the start of each ringing cycle.

Fig. 1 also comprises ten relays as shown numbered 100 to 190 inclusive. Relay 100 is a switch through relay which operates on a call to a trunk, to by-pass the talking condensers and connect the talking conductors straight through to the trunk repeater, which then takes over the normal function of the connector such as timing, pulse repeating, and the like. Relay 110 is the connector line relay, which operates over the talking conductors 80 and 81 upon seizure of the connector, and causes the operation of the release relay 130 and the hold relay 140. Relay 120 is the battery reversing relay, normally controlled from the back bridge relay 160. Relay 150 is the counting chain release relay which controls the resetting of the pulse counting relays after each digit of the call number dialled by the calling party. Relay 170 is the ringing digit switching relay which operates upon the dialling of the ringing digit to prepare the ringing circuits; relay 180 is the pickup relay which operates from the ringing interrupter to assure that the ringing current will be connected to the called line only at the start of a ringing cycle; and relay 190 is the ring-cut-off relay which operates to stop the ringing, when the called party answers.

Fig. 2, which is a continuation of the connector circuit, consists also of ten relays, numbered 200 to 290 as indicated. Relay 200 is a drain relay, which operates in conjunction with the ring coding relay 220, to prevent ringing voltages from being stored up in the line. Relay 210 is the ring switching relay, which is controlled from the sixth counting relay, and determines which side of the called line is to be rung. Relays 230 and 240 are the busy test and idle test relays, which determine the busy or idle condition of the called line, relay 250 is the preliminary digit switching relay, and relays 260 to 280 are digit transfer relays which operate in succession after the first, second and third digits of a local call number, to prepare various switching and control circuits which will be discussed in more detail in the description of the operation. Relay 290 on the other hand is a dialling transfer relay, which operates on each digit of a call number, to hold the switching circuits open during the actual pulsing, and releases to close them after each digit.

Fig. 3 contains ten counting chain relays designated 310 to 300 inclusive and three counting chain control relays 310', 320', and 330'. These counting relays control the outgoing switching circuits of the connector, and operate in response to the dial pulses, as repeated over the pulsing circuit of the connector. The counting relays operate in succession during the first half of each pulse, and a counting control relay operates in series with them during the second half of each pulse, each pair of relays being released when the succeeding pair operates. The counting control relays are used reflexively, so that relay 310' will operate with counting relay 310, and also with relays 340, 370 and 300. Likewise, relay 320' will operate with counting relays 320, 350 and 380, and relay 330' with counting relays 330, 360 and 390. The last operated relays complete the switching operations required, between digits, and then also release, in preparation for the succeeding digit.

Fig. 4 shows a portion of the connector tens and units relays, together with the units switching or sub-group relay 400. Only one tens or group relay is shown, that being the relay 470 in the upper right corner of the sheet, representing the first tens group, also designated as group T10. These tens group relays are operated selectively by the counting relays in response to the dialling, and when operated connect the outgoing talking and control conductors of all ten lines or trunks in that group to the switching springs of the various units relays. To save space, only 4 lines are shown outgoing from relay 470, these being the first, fifth, sixth and tenth, or more properly, lines 11, 15, 16 and 10, represented by the four sets of three conductors each, extending to the right from relay 470. In a fully equipped 100 line switchboard, ten of these relays would be required in each connector. A total of five units relays is also provided in each connector, although only two are shown in Fig. 4. These are the relays 410 and 450 representing the units 1 and 6, and 5 and 0 respectively. The units relays are also operated selectively by the counting relays, or indirectly by the trunk selecting relays, and when operated, each relay serves to connect two sets of talking and control conductors from the tens relays to the break-make springs of the units switching relay. As to which of these sets is actually connected through to the talking and control conductors 158, 165 and 215 in the connector, depends on the position of the units switching relay 400 which is also controlled from the counting relays or from the trunk selecting relays in the same manner as the units relays, to determine the units sub-group. With relay 400 normal, the 1 to 6 sub-group is involved, and with relay 400 operated, the 5 to 0 sub-group is indicated. Thus with relays 470 and 410 operated, if relay 400 is normal, the connector will be cut through to line 11, by way of back contacts 401, 402 and 404, make contacts 411, 412 and 413, and make contacts 475, 476 and 477; while if relay 400 is operated, the connector is cut through instead to line 16, by way of make contacts 401, 402 and 404, make contacts 414, 415 and 416, and make contacts 481, 482 and 483. And so on, for the entire ten lines of the group controlled by the group relay 470.

Figure 5:
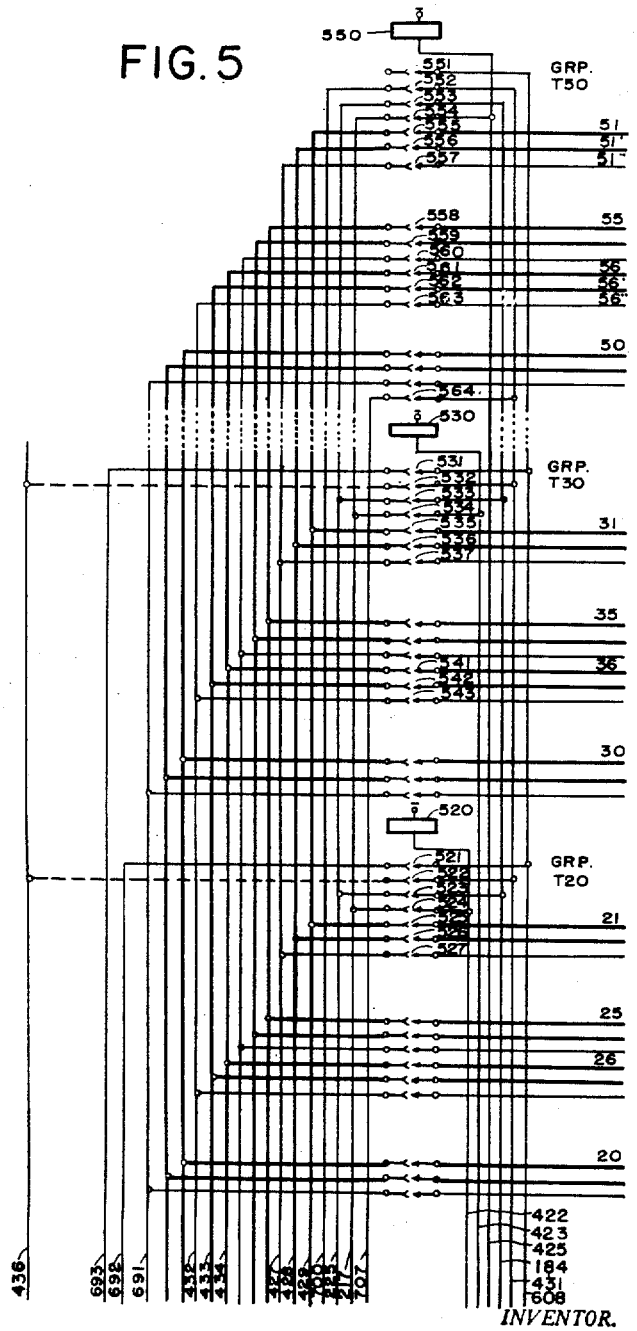

In Fig. 5 are shown additional tens or group relays designated 520, 530 and 550 representing groups 20, 30 and 50 respectively. Each of these relays is identical with the group relay 470 of Fig. 4, and operates similarly, except that group relay 550 is associated with the P. B. X trunks. As in the case of relay 470, only four sets of line conductors are shown outgoing from each of these relays, all having corresponding values. Thus with reference to group relay 520, the four lines indicated represent the lines 21, 25, 26 and 20, in that order, while the four lines shown outgoing from the springs of relay 530 represent the lines 31, 35, 36 and 30. And for relay 550, the outgoing lines shown are the lines 51, 55, 56, and 50. These group relays operate from the counting relays, in conjunction with the units and sub-group relays to select the dialled line, exactly as explained for the group relay 470 of Fig. 4.

In Fig. 6, a group access relay such as 610, 620 or 630 is provided, for each connector in the system, although only three are indicated in this case. These relays operate when seized by the associated connector on a trunk call and connect the units switching leads from the connector through to the group select relays to the right of this figure. The group access relays are operated only momentarily, and are provided with a special lockout chain which prevents a second relay operating while any other relay is operated, in order to prevent, or reduce the likelihood of double connections. Lockout relay 640 and kick-off relay 650 are common relays which are also a part of the group access relays. Relay 640 operates momentarily when any access relay is operated, to open the operate circuit of the other access relays, and if the call is not cut through promptly, relay 650 restores to give the busy signal and at the same time preselect the next idle trunk. A group select relay, such as 660, 670 or 680 in Fig. 6, is provided for each tens group to which toll or interoffice trunk groups have been assigned. These relays operate from the tens relays in the connector, from a special ground provided by the group access relays, and extend the units switching leads from the operated access relay, through to the proper trunk select relays.

In Fig. 7 is shown a complete set of trunk select relays for a P. B. X trunk group having a total of ten trunks. In practice, in a small town, such a large group of P. B. X trunks would seldom if ever be required, and the number of relays would be reduced accordingly. However, the complete set is shown here, to better indicate the arrangement. The relays shown in the lower row, such as 710, 720, etc., are the trunk busy relays, one of which is required for each trunk in the group except the last. This applies regardless of the number of trunks involved. One of these relays is connected to the test conductor of each trunk in the group but the last, and operates from ground on this lead whenever the associated P. B. X trunk is engaged. The relays shown in the upper row, such as 715, 725, etc., are the trunk select relays, and one of these is required for each P. B. X trunk in the group. They are controlled entirely from the trunk busy relays, and no more than two of these relays including the first, can be operated at any given time. The function of each of these relays is to prepare a circuit to the corresponding units relay or relays in the connector, which circuit is completed in response to the dialling of the third digit in the P. B. X call number. Since no locking circuit is provided, the first idle trunk is selected in all cases. Separate sets of units and sub-group contacts must be provided on these relays for each connector in the system.

In Fig. 8, a trunk access relay such as 810, 820, or 830 is required, for each connector in the system, although here also, as for the group access relays, only three are shown. These relays operate momentarily when seized by the associated connector over the separate access leads provided, and serve to connect the units switching conductors from the connector, direct to the special group of trunk select relays in the lower part of Fig. 9. The arrangement of the trunk access relays is identical with that of the group access relays of Fig. 6, except for the omission of the group-select-ground springs such as 611. These springs are not required in this case, since no group select relays are used. Relays 840 and 850 are the lockout and kick-off relays corresponding to the relays 640 and 650 of Fig. 6. The arrangement of these relays is again identical, except that the lockout relay 840 provides the trunk select relays with the units operate ground normally obtained from the group select relays of Fig. 6.

In Fig. 9 is shown the basic circuit for the regular trunk select relays, two separate relay groups being shown, each equipped to handle three trunks. In these circuits, a trunk busy relay such as 910 or 950, and a trunk select relay such as 915 or 955 is required for each trunk in the group. Each trunk busy relay is normally operated, through a series of break contacts in the associated trunk repeater, and releases whenever the trunk is seized by a call, whether incoming or outgoing. The trunk select relays operate one at a time in rotation, under the control of the trunk busy relays, to preselect the next idle trunk. As each select relay operates, it releases the previously operated select relay, and prepares the circuit of the proper units relay in the connector. Ground for the operation of the connector units relays is received from the group select relays of Fig. 6 or the trunk access relays of Fig. 8 as required. Relays 940 and 980 are reset relays whose function it is to re-set the select chain after the last trunk has been seized, and relays 945 and 985 are all-trunks-busy relays, which control the various counting meters indicated, such as, if desired, a peg count meter, an all trunks busy meter, and an overflow meter.

Both sets of trunk select relays in Fig. 9 are identical and are, as stated, associated with the same tens group. Their select springs are also associated with the same units relays, namely 1–6, represented by connector relay 410, and 2–7 and 3–8, not shown. In the lower set of trunk select relays in Fig. 9, however, the upper select springs are wired to the units switching or sub-group conductor, such as 996. By this means, the upper set of relays is made to serve the #1, 2 and 3 terminals of the 30 group tens relay in the connector to which the first three trunks are assigned, while the lower set is made to serve the #6, 7 and 8 terminals of the same tens relay to which the second three trunks are assigned.

These trunk groups of course, can be readily expanded, contracted or re-arranged in almost any manner desired within the tens group, assuming that corresponding changes are made in the trunk select relays, and any line terminals not used for trunks may be assigned to subscribers' lines. The same thing applies to the more usual case where but one trunk group is assigned to any one tens relay, as with the select relay sets indicated by the rectangles 655 and 656 in Fig. 6. Such groups may include as many as ten trunks if desired. This of course would require a full set of ten select relays, with the units switching lead connected up in five of them, and not connected in the other five.

*Numbering scheme*

The switchboard is normally arranged so that toll trunks and inter-office trunks are assigned to tens groups, 10, 20, 30 and 40, while P. B. X trunks are assigned to tens groups 50 and 60. The trunk groups usually start on the first terminal and use successive terminals of the tens group, in order to facilitate expansion. This is not essential however. Subscriber lines may be assigned to any tens group where terminals are available.

Toll and inter-office trunks are seized, in all cases, by dialling a single-digit number. These single-digit numbers are "0," "9," "8" and "7." Normally, the digit "0" operates group relay #10 (tens relay 470), the digit "9," group relay #20 (tens relay 520), the digit "8," group relay #30 (tens relay 530), and the digit "7," group relay #40, not shown. In the arrangement employed in the present disclosure however, both of the digits "8" and "7" will operate group relay #30, thus eliminating the need for group relay #40, or freeing it for other uses, such as calls to subscribers' lines entirely. On all trunk calls, the proper units relay is operated automatically, from the trunk selecting equipment, as previously indicated.

Subscriber call numbers consist invariably of four digits, always beginning with a preliminary digit "2," followed by a variable tens digit, a variable units digit, and a variable ringing or code selecting digit. The last three digits may be any digit from 1 to 0 inclusive, or as permitted by the assignment of trunks.

P. B. X. call numbers also consist of four digits, the first or preliminary digit being always "2," the second or tens digit either a "5" or a "6," the third or units digit a "1," and the fourth or ringing digit also a "1." The complete call numbers would thus be either "2511" or "2611." The units digit "1" in this case, may or may not operate the first units relay, as this depends entirely on the idle or busy condition of the first P. B. X. trunk. The final digit "1" selects the first ringing code in all cases. This consists of a single long ring of about two seconds' duration, repeated intermittently.

To summarize briefly:

1. A first digit "0" indicates a call to a toll trunk;

2. A first digit "9," "8" or "7" indicates a call to an inter-office trunk;

3. A first digit "2" indicates a call to a subscriber's line or to a P. B. X. trunk;

4. First digits "1," "3," "4," "5" or "6" are not used, and if dialled, inadvertently or otherwise, they are absorbed, and are thus for all practical purposes without effect.

The general description of the apparatus and its general method of functioning having been completed, a detailed description of the operation of the circuits will now be given, by actually following a few typical calls through the system.

*Seizure of the connector*

When a finder, upon the initiation of a call, connects the calling line through to the associated connector, the connector line relay 110 operates over the calling line loop as follows: ground through the upper winding of relay 110, break contacts 121, break contacts 101, line conductor 80, through the calling subscriber's line and telephone instrument, back over line conductor 81, through break contacts 102, break contacts 122, and the lower winding of relay 110 to negative battery.

The connector line relay 110 operating, at make contacts 111 closes a circuit from ground through break springs 106 to release relay 130 which operates. The release relay 130 in turn, at make contacts 131 closes an obvious circuit to the hold relay 140, which also operates.

The hold relay 140 upon operating, at make contacts 144 connects ground from make springs 131 to the control conductor 83 and thence back through the finder of the link to the cut-off and lockout relays in the line circuit of the calling line, which relays operate in series and disconnect the line relay of the line circuit from the line. The subscriber's line relay thereupon restores to start the release of the allotter and at the same time re-connects the control and control normal leads together as previously mentioned.

The hold relay 140 also, at make contacts 149 connects ground to the tone and timer start conductor 87 in order to start the timing and tone generating equipment, and at make contacts 141 connects dial tone to the calling line. This latter circuit extends from ground battery and the secondary of the dial tone induction coil to the dial tone conductor 249 shown in the upper part of Fig. 2, through break contacts 271 and 261, conductor 156, makes contacts 141, conductor 135, line condenser 109, break contacts 122 and 102, negative line conductor 81, through the calling subscriber's telephone and back over the positive line conductor 80, and through back contacts 101 and 121 and the upper winding of connector line relay 110 to ground. Dial tone is made audible at the calling telephone over this circuit as an indication that dialling may proceed.

The hold relay also, at make contacts 142 prepares locking circuits for relays 120, 170, 210, 230, and the counting relays of Fig. 3; at make contacts 143 prepares the pulsing circuit; at make contacts 145 prepares a circuit for the test relay 240; and at make contacts 146 prepares locking circuit for test relay 240, and for the transfer relays 260, 270, and 280. Finally at make contacts 147, relay 140 grounds the hold conductor 84 back to the finder to hold the finder tens and units relays operated, and at break contacts 148 opens a locking circuit to the associated link select relay in the allotter, by way of the locking conductors 85 and 86, thereby to permit the release of this relay and the preselection of the next idle link.

*Call to a subscriber's station*

The connector is now ready for dialling, with the line, release, and hold relays 110, 130 and 140 operated. The operation on a call to a regular subscriber's station will be described first, it being understood that a 4 digit number starting with the digit "2" is used on all such calls. Subscribers' lines may appear of course in any tens group, but for purposes of illustration it will be assumed that the call is to a station having the call number "2151." The calling subscriber on hearing the dial tone, proceeds therefore to dial the first digit "2."

The connector line relay 110 follows the dial pulses and at each pulse, its make contacts 111 momentarily open the circuit of release relay 130. Because of the slow release nature of relay 130 however, due to the use of a copper sleeve over the coil, this relay is not outwardly affected and remains operated. At each release of the line relay also, its break contacts 111 momentarily close the pulsing circuit to the counting relays, and to the transfer relay 290 which is in parallel with this circuit. Relay 290 operates on the first pulse, and because of its slow release nature, due again to the use of a copper sleeve over the coil, remains operated during the succeeding pulses of each digit, releasing shortly after the end of each series of pulses.

On the first release of line relay 110 therefore, the back contacts 111 close a circuit to the pulsing relay 310 as follows: ground at break contacts 106, break contacts 111, make contacts 143, break contacts 171, conductor 179, break contacts 234, conductor 206 left, break contacts 333', break contacts 323', break contacts 313', and the winding of the counting relay 310 to negative battery. A branch of this circuit also extends from break contacts 234 over conductor 206 right, to the winding of transfer relay 290 and negative battery.

Relays 290 and 310 operate over this circuit, the principal function of relay 290 being at this time to open the grounding circuits to the springs of the counting relays. The counting relay 310, at its make contacts 311, extends its operating ground to the winding of the counting control relay 310'. This latter relay is not affected at the moment however, due to having ground also on the other side of its winding, from make contacts 142, by way of break contacts 151 and 103, conductor 167, break contacts 233, conductor 205, and break contacts 324'. Relay 310 also, at make contacts 316, prepares the operate circuit of the next counting relay 320.

Upon the re-energization of line relay 110, at the end of the first impulse, make contacts 111 re-close the circuit of release relay 130, while break contacts 111 open the pulsing circuit momentarily to the transfer relay 290 and counting relay 310. Relay 290 maintains its armature in the operated position during this interval, due to its slow to release nature, as previously mentioned. The opening of the operate circuit to the pulsing relay 310 however, removes the short circuit from the winding of the counting control relay 310'. Relay 310' thereupon operates in series with relay 310, locking the latter relay in its operated position over the following circuit: ground through make contacts 142, break contacts 151, break contacts 103, conductor 167, break contacts 233, conductor 205 left, break contacts 324', winding of relay 310', make contacts 311, and the winding of relay 310 to negative battery.

Relay 310' upon operating, at its break contacts 313' disconnects the pulsing circuit from the operating circuit of counting relay 310 and at make contacts 313' connects it to the operating circuit of counting relay 320 by way of make contacts 316. The operation of the remaining contacts on relays 310' and 310 is without effect at this time.

Upon the next release of line relay 110, at the start of the second impulse of the first digit "2," make contacts 111 again open the circuit of release relay 130 momentarily, while the make contacts 111 again connect ground to the impulsing circuit momentarily. Counting relay 320 operates over this circuit which as before is from ground at break contacts 106, through break contacts 111, make contacts 143, break contacts 171, conductor 179, break contacts 234, conductor 206 right to the winding of relay 290, conductor 206 left, break contacts 333' and 323' and thence through make contacts 313' and 316, and the winding of relay 320 to negative battery.

Counting relay 320 upon operating, at make contacts 323 prepares a circuit to the preliminary digit switching relay 250, at make contacts 326 prepares the operating circuit of counting relay 330, and at make contacts 321 extends its own operating ground to the winding of the counting control relay 320'. Relay 320' does nothing however, at the moment, because of also having ground on the other side of its winding, from make contacts 142, by way of conductor 205. Relay 290 remains operated.

Upon the next re-energization of line relay 110, at the end of the second and final impulse of the first digit, make contacts 111 again close and re-establish the circuit of release relay 130, while break contacts 111 open and again remove pulsing ground from the pulsing circuit, thereby opening the operate circuits to relays 290 and 320. This removes the short circuit from the counting control relay 320' and this relay therefore operates in series with counting relay 320 over the following circuit: ground through make contacts 142, break contacts 151 and 103, conductor 167, break contacts 233, conductor 205, break contacts 334', winding of relay 320', make contacts 321 and the winding of relay 320 to negative battery.

Relay 320' upon operating, at break contacts

Relay 320' upon operating, at break contacts

324' opens the locking circuit of relays 310' and 310, whereupon both of these relays release. Relay 320' also, at break contacts 323' disconnects the pulsing conductor 206 from the operate circuit of counting relay 320, and at make contacts 323' connects it to the operate circuit of counting relay 330, by way of make contacts 326. Finally, relay 320' at make contacts 325', grounds conductor 204 leading to break springs 294 on the transfer relay 290. The other contacts of relay 320' are without effect at this time.

Transfer relay 290 now releases, after a short delay, and at break contacts 294, 293 and 292 connects ground to conductors 253, 254 and 259 and thence through the cable 227 to the springs of the counting relays. This circuit is from ground at make contacts 142, conductor 166, conductor 203, make contacts 325', conductor 204, conductor 199 right, and break contacts 294, at which point the circuit divides and goes on to the counting relays over three separate paths. One of these paths is through break contacts 292, 264 and 275 and the conductor 253 to the counting relays, where only open contacts are encountered. This branch is therefore without effect at this time. A second path is through break contacts 265, 276, 277 and 293, and the conductor 259 to the counting relays, where again only open contacts are encountered. This branch is therefore likewise without effect when a "2" is dialled. The third path is through break contacts 265, break contacts 276, conductor 254, through cable 227, conductor 254 in the counting relays, make contacts 323, conductor 226, and the winding of relay 250 to negative battery.

The preliminary digit switching relay 250 now operates, and at make contacts 251 extends its operating ground to the winding of the preliminary digit transfer relay 270. This latter relay however, has ground also on the other side of its winding, from conductor 184 left and make contacts 146 on the hold relay, and does nothing at the moment. Relay 250 also, at make contacts 252 completes a circuit to the counting chain release relay 150 as follows: ground from make contacts 146, through conductor 184, make contacts 252, break contacts 274 and 263, conductor 186, and the winding of relay 150 to negative battery.

The counting chain release relay 150 operates momentarily over this circuit, and at break contacts 151 disconnects ground from the conductors 167 and 205, and hence from the counting and counting control relays 320 and 320', which as previously explained, are held locked in series over these conductors from the ground at make springs 142. Relays 320 and 320' thereupon release and restore their springs to normal. The opening of make contacts 325' and 323 opens the operate circuit of the preliminary digit switching relay 250. This removes the ground shunt from the preliminary digit transfer relay 270, permitting the latter relay to operate in series with relay 250 and locking both relays operated. The locking circuit for these relays is from the ground at make contacts 146, over conductor 184, through the winding of relay 270, make contacts 251, and the winding of relay 250 to negative battery.

The preliminary digit transfer relay 270 upon operating, at break contacts 271 obviously opens the dial tone circuit to the calling line, and at make contacts 272 prepares an alternative circuit for the transfer relay 290 from the pulsing circuit, shunting the break contacts 234 on the busy relay 230. At break contacts 273 relay 270 opens the circuit of the switch-through relay 100, and at make contacts 273 prepares a circuit for operating the counting chain release relay 150 from the units relays. Relay 270 also, at break contacts 274, opens the original circuit to relay 150, thereby causing the release of this relay, and at make contacts 274 prepares a circuit for operating relay 150 from the tens group relays. Finally, relay 270 at contacts 275, 276 and 277 opens the circuits leading to the counting relay conductors 253, 254 and 259, and prepares circuits to the conductors 255 and 256 leading to the group selecting springs of the counting relays. Connector relays 110, 130, 140, 250 and 270 are now operated.

The second digit of the call number "2151" causes line relay 110 to release and re-operate once only, in response to the second operation of the dial. On the break of the pulse, when relay 110 releases, transfer relay 290 and counting relay 310 again operate in parallel over the pulsing conductors 179 and 206, from the ground at break springs 106, as previously explained. Release relay 130 remains operated as usual, since its circuit is only broken momentarily at make contacts 111. On the make of the pulse, when line relay 110 re-operates, the circuit of release relay 130 is reestablished and the operate circuit of relays 290 and 310 is broken. The opening of the op- Examine erate circuit of the counting relay 310 permits the operation of counting control relay 310′ as before, in series with counting relay 310, from ground at make springs 142, by way of conductors 167 and 205, and break springs 324′. Relay 310 therefore remains operated.

Transfer relay 290 releases however, after a short delay, and at break contacts 294 and 292 connects ground to conductors 255 and 256 and the associated "group" springs of the counting relays. This circuit is from ground at make contacts 142, over conductors 166 and 203, through make contacts 315′, conductor 204, conductor 199 right, and break contacts 294, at which point the circuit divides and goes on to the spring of the counting relays over two separate paths. One of these paths is through break contacts 265, make contacts 276, and conductor 256 to the counting relays, where only open contacts are encountered. The other circuit is through break contacts 292, break contacts 264, make contacts 275, conductor 255, over the cable 227, conductor 255 at the counting relays, make contacts 314, conductor 421, and the winding of the first tens-group relay 470 to negative battery.

Tens relay 470 operates over this latter circuit and closes its contacts, thereby preparing circuits to all of the lines in the called line tens group. At make contacts 474, group relay 470 extends its own operating ground to the winding of the tens digit transfer relay 260, by way of conductor 217. Relay 260 does nothing at this time however, due to having ground also on the other side of its winding from make contacts 146, through conductor 184. Group relay 470 also, at make contacts 473 completes a circuit for the operation of the counting chain relase relay 150 as follows: ground at make contacts 146, conductor 184, make contacts 473, conductor 225 down, make contacts 274, break contacts 263, conductor 186 and the winding of relay 150 to negative battery.

The counting chain release relay 150 operates over this circuit and at break contacts 151 disconnects ground from conductors 167 and 205 and hence from the counting and counting control relays 310 and 310′ which are held locked in series over these conductors from ground at make contacts 142. Relays 310 and 310′ thereupon release and restore their contacts to normal. The opening of make contacts 315′ and 314 opens the operate circuit to the group relay 470. This removes the shunt from the winding of the tens digit transfer relay 260, whereupon relay 260 operates in series with relay 470 and locks the latter relay in its operated position over the following circuit: ground at make contacts 146, conductor 184, winding of relay 260, conductor 217, make springs 414, and the winding of relay 470 to negative battery.

The tens digit transfer relay 260 upon operating at break contacts 261 opens a second point in the dial tone circuit, and at make contacts 262 prepares a circuit for the units switching or subgroup relay 400, over conductors 213 and 214. Relay 260 also, at break contacts 263 opens the circuit to the counting chain release relay 150 causing this relay to release, and at make contacts 266 grounds the ringing machine start lead 198 by way of conductor 197 and break contacts 175. Finally, relay 260 at break-make contacts 264 and 265 opens the circuits leading to the counting relay conductors 255 and 256 associated with the tens selecting springs, and prepares circuits to the conductors 257 and 258 leading to the units selecting springs of the counting relays.

Connector relays 110, 130, 140, 250, 260, 270 and 470 are now operated.

The third digit of the call number "2151" causes the connector line relay 110 to release and reoperative five times, the transfer relay 290 operating as before on the first pulse, in parallel with the pulsing circuit, and remaining operated until shortly after the last pulse of the digit, since it is re-energized momentarily at each release of relay 110.

At the first release of relay 110 therefore, relay 290 and the counting relay 310 operate from break contacts 111, over the plusing conductors 170 and 206, relay 310 preparing its own locking circuit as before at make contacts 311, and at make contacts 316 preparing the circuit of counting relay 320. On the re-operation of relay 110, the pulsing circuit is opened as before at break springs 111, and counting control relay 310′ operates in series with the first counting relay 310, from ground on the locking conductors 167 and 205, by way of break springs 324′ and make springs 311.

At the second release of relay 110, counting relay 320 operates from ground on the pulsing conductors 179 and 206, by way of make contacts 313′ and 316. Relay 320 at make contacts 321 prepares its own locking circuit, and at make contacts 326 prepares the circuit of counting relay 330. On the re-operation of relay 110, break contacts 111 again remove ground from the pulsing conductors 179 and 206 whereupon the counting control relay 320′ operates in series with the second counting relay 320, from ground on the locking conductors 167 and 205, by way of break springs 334′ and make springs 321. Relay 320′ at break-make contacts 323′ disconnects the pulsing conductor 206 from the counting relays 310 and 320 and connects it to the counting relay 330. Relay 320′ also at break contacts 324′ opens the locking circuit of relays 310′ and 310, causing the release of these relays.

At the third release of relay 110 counting relay 330 operates over the pulsing conductors 179 and 206, by way of make contacts 323′ and 326. Relay 330 at make contacts 331 prepares a locking circuit for itself and at make contacts 336 prepares the operate circuit of counting relay 340. On the re-operation of relay 110, break contacts 111 again open the pulsing circuit to conductors 179 and 206, and on the removal of its ground shunt, counting control relay 330′ operates in series with counting relay 330 from ground on the locking conductors 167 and 205, by way of break springs 314′ and make springs 331. Relay 330′ at break make contacts 333′ disconnects the pulsing conductor 206 from the counting relays 310, 320, and 330 and connects it to the fourth counting relay 340. Relay 330′ also at break contacts 334′ opens the locking circuit of relays 320′ and 320, and causes the release of these relays.

At the fourth release of relay 110, the fourth counting relay 340 operates from the pulsing conductors 179 and 206, by way of make contacts 333′ and make contacts 336. Relay 340 at make contacts 341 prepares a locking circuit for itself through the winding of counting control relay 310′, and at make contacts 346 prepares the operate circuit of counting relay 350. On the reoperation of the relay 110 ground is again removed from the pulsing conductors 179 and 206 and hence from the operate circuit of counting relay 340, whereupon the counting control relay 310′ operates in series with relay 340, from Examiner erate circuit of the counting relay 310 permits the operation of counting control relay 310' as before, in series with counting relay 310, from ground at make springs 142, by way of conductors 167 and 205, and break springs 324'. Relay 310 therefore remains operated.

Transfer relay 290 releases however, after a short delay, and at break contacts 294 and 292 connects ground to conductors 255 and 256 and the associated "group" springs of the counting relays. This circuit is from ground at make contacts 142, over conductors 166 and 203, through make contacts 315', conductor 204, conductor 199 right, and break contacts 294, at which point the circuit divides and goes on to the spring of the counting relays over two separate paths. One of these paths is through break contacts 265, make contacts 276, and conductor 256 to the counting relays, where only open contacts are encountered. The other circuit is through break contacts 292, break contacts 264, make contacts 275, conductor 255, over the cable 227, conductor 255 at the counting relays, make contacts 314, conductor 421, and the winding of the first tens-group relay 470 to negative battery.

Tens relay 470 operates over this latter circuit and closes its contacts, thereby preparing circuits to all of the lines in the called line tens group. At make contacts 474, group relay 470 extends its own operating ground to the winding of the tens digit transfer relay 260, by way of conductor 217. Relay 260 does nothing at this time however, due to having ground also on the other side of its winding from make contacts 146, through conductor 184. Group relay 470 also, at make contacts 473 completes a circuit for the operation of the counting chain relase relay 150 as follows: ground at make contacts 146, conductor 184, make contacts 473, conductor 225 down, make contacts 274, break contacts 263, conductor 186 and the winding of relay 150 to negative battery.

The counting chain release relay 150 operates over this circuit and at break contacts 151 disconnects ground from conductors 167 and 205 and hence from the counting and counting control relays 310 and 310' which are held locked in series over these conductors from ground at make contacts 142. Relays 310 and 310' thereupon release and restore their contacts to normal. The opening of make contacts 315' and 314 opens the operate circuit to the group relay 470. This removes the shunt from the winding of the tens digit transfer relay 260, whereupon relay 260 operates in series with relay 470 and locks the latter relay in its operated position over the following circuit: ground at make contacts 146, conductor 184, winding of relay 260, conductor 217, make springs 414, and the winding of relay 470 to negative battery.

The tens digit transfer relay 260 upon operating at break contacts 261 opens a second point in the dial tone circuit, and at make contacts 262 prepares a circuit for the units switching or subgroup relay 400, over conductors 213 and 214. Relay 260 also, at break contacts 263 opens the circuit to the counting chain release relay 150 causing this relay to release, and at make contacts 266 grounds the ringing machine start lead 198 by way of conductor 197 and break contacts 175. Finally, relay 260 at break-make contacts 264 and 265 opens the circuits leading to the counting relay conductors 255 and 256 associated with the tens selecting springs, and prepares circuits to the conductors 257 and 258 leading to the units selecting springs of the counting relays.

Connector relays 110, 130, 140, 250, 260, 270 and 470 are now operated.

The third digit of the call number "2151" causes the connector line relay 110 to release and reoperative five times, the transfer relay 290 operating as before on the first pulse, in parallel with the pulsing circuit, and remaining operated until shortly after the last pulse of the digit, since it is re-energized momentarily at each release of relay 110.

At the first release of relay 110 therefore, relay 290 and the counting relay 310 operate from break contacts 111, over the plusing conductors 170 and 206, relay 310 preparing its own locking circuit as before at make contacts 311, and at make contacts 316 preparing the circuit of counting relay 320. On the re-operation of relay 110, the pulsing circuit is opened as before at break springs 111, and counting control relay 310' operates in series with the first counting relay 310, from ground on the locking conductors 167 and 205, by way of break springs 324' and make springs 311.

At the second release of relay 110, counting relay 320 operates from ground on the pulsing conductors 179 and 206, by way of make contacts 313' and 316. Relay 320 at make contacts 321 prepares its own locking circuit, and at make contacts 326 prepares the circuit of counting relay 330. On the re-operation of relay 110, break contacts 111 again remove ground from the pulsing conductors 179 and 206 whereupon the counting control relay 320' operates in series with the second counting relay 320, from ground on the locking conductors 167 and 205, by way of break springs 334' and make springs 321. Relay 320' at break-make contacts 323' disconnects the pulsing conductor 206 from the counting relays 310 and 320 and connects it to the counting relay 330. Relay 320' also at break contacts 324' opens the locking circuit of relays 310' and 310, causing the release of these relays.

At the third release of relay 110 counting relay 330 operates over the pulsing conductors 179 and 206, by way of make contacts 323' and 326. Relay 330 at make contacts 331 prepares a locking circuit for itself and at make contacts 336 prepares the operate circuit of counting relay 340. On the re-operation of relay 110, break contacts 111 again open the pulsing circuit to conductors 179 and 206, and on the removal of its ground shunt, counting control relay 330' operates in series with counting relay 330 from ground on the locking conductors 167 and 205, by way of break springs 314' and make springs 331. Relay 330' at break make contacts 333' disconnects the pulsing conductor 206 from the counting relays 310, 320, and 330 and connects it to the fourth counting relay 340. Relay 330' also at break contacts 334' opens the locking circuit of relays 320' and 320, and causes the release of these relays.

At the fourth release of relay 110, the fourth counting relay 340 operates from the pulsing conductors 179 and 206, by way of make contacts 333' and make contacts 336. Relay 340 at make contacts 341 prepares a locking circuit for itself through the winding of counting control relay 310', and at make contacts 346 prepares the operate circuit of counting relay 350. On the reoperation of the relay 110 ground is again removed from the pulsing conductors 179 and 206 and hence from the operate circuit of counting relay 340, whereupon the counting control relay 310' operates in series with relay 340, from ground on the locking conductors 167 and 205, by way of break springs 324' and make springs 341. Relay 310' upon operating, at make contacts 313' further prepares the operate circuit for counting relay 350, and at break contacts 314' opens the locking circuit of relay 330' and 330, whereupon these relays release.

At the fifth release of relay 110, the fifth counting relay 350 operates from pulsing conductors 179 and 206, by way of break contacts 333' and 323', and make contacts 313' and 346. Counting relay 350 at make contacts 351 prepares a locking circuit for itself through the winding of relay 320' and at make contacts 356 prepares the operate circuit of counting relay 360. On the reoperation of relay 110, removal of pulsing ground from the pulsing conductors 179 and 206 and hence from the operate circuit of the counting relay 350 permits the operation of counting control relay 320' in series with relay 350, from ground on the locking conductors 167 and 205, by way of break springs 334' and make springs 351. Relay 325' upon operating, at make contacts 323' further prepares the operate circuit of counting relay 360, and at break contacts 324' opens the locking circuit of relays 310' and 340, causing the release of these relays. The other contacts of relay 320' have no particular functions at this time, although make contacts 321' close an alternative circuit to the ringing machine start conductor 198 from ground through make contacts 266 and conductor 207. The original circuit, through make contacts 266, conductor 167 and break contacts 175 remains intact however, for the time being.

Transfer relay 290 now releases, shortly after the fifth and last digit, and at break contacts 294 and 292 connects ground to conductors 257 and 258 and thus to the associated "units" springs of the counting relays. The circuit starts as before from ground at make contacts 142, and passes through conductors 166 and 203, make contacts 325', conductor 204, conductor 199 right, and break contacts 294, at which point the circuit divides and proceeds over two separate paths. One of these paths is through make contacts 265, break contacts 286, conductor 258, cable 227, and conductor 258 again in the counting relays, where only open contacts are encountered. The second path is through break contacts 292, make contacts 264, break contacts 285, conductor 257, cable 227, conductor 257 in the counting relays, make contacts 355, conductor 435, and the winding of the 5–0 units relay 450 to negative battery.

The units relay 450 operates over this circuit, and at make contacts 451 and 452 extends the talking conductors of the connector to the called line 15. Thus, the talking conductor 158 in the upper part of Fig. 4, is connected through break contact 401, make contacts 451 and make contacts 478 to the line conductor 15, while talking conductor 165 is connected through break contacts 402, make contacts 452 and make contacts 479 to the line conductor 15'. Similarly, test conductor 215 is connected through break contacts 404 and make contacts 453 and 480 to the test conductor 15'' of the called line, which will be assumed to have negative battery on it, indicative of an idle line.

The units relay 450 also, at make contacts 458, extends its own operating ground to the winding of the units digit transfer relay 280, by way of conductor 218. Relay 280 is not affected at the moment, however, due to having ground also on the other side of its winding, from conductor 184 and make contacts 146. Finally, relay 450 at make contacts 457, completes a circuit to the counting chain release relay 150 as follows: ground at make contacts 146, conductor 184, make contacts 457, conductor 219, make contacts 273, break contacts 284, conductor 186, and the winding of relay 150 to negative battery.

The counting chain release relay 150 operates over this circuit, and at break contacts 151 disconnects ground from conductors 167 and 205, to which the counting and counting control relays 350 and 320' are held locked in series, as previously explained. Relays 350 and 320' therefore release and restore their contacts to their normal position. When the make contacts 325' and 355 open, they open the operate circuit to the units relay 450. This removes the ground shunt from the winding of the units digit transfer relay 280. Relay 280 thereupon operates in series with the units relay 450, and locks the latter relay operated, from ground at make contacts 146, by way of conductor 184, the winding of relay 280, conductor 218, make contacts 458, and the winding of relay 450 to negative battery.

The units digit transfer relay 280 upon operating, at break contacts 284 opens the circuit to the counting chain release relay 150, causing the release of this relay. At break contacts 285 and 286, relay 280 opens the circuits to conductors 257 and 258 leading to the units springs of the counting relays, and at make contacts 285 prepares a circuit to the ringing digit switching relay 170. At break-make contacts 281, relay 280 disconnects the units switching or "subgroup" relay 400 from conductor 213 leading to springs no the sixth counting relay, and connects the ring switching or side-of-line-select" relay 210 to the same conductor 213. At make contacts 282, relay 280 prepares an alternative locking circuit for the counting relays, shunting break contacts 233 on the busy relay. This action is without significance at this time, however. Finally, at break-make contacts 283, relay 280 disconnects the busy test relay 230 from the test conductor 215 and connects the idle test or "switching" relay 240 thereto in its stead.

The called line being idle, as stated, a circuit for the operation of the idle test relay 240 is now established as follows: ground at break contacts 107, through make contacts 145, conductor 183, upper winding of test relay 240, break contacts 235, make contacts 283, test conductor 215, break contacts 404, make contacts 453, make contacts 480, line test conductor 15'' and the windings of the cut-off and lockout relays in the line circuit of the called line to negative battery. The line cut-off and lockout relays operate over this circuit to clear the called line of attachments in the usual manner.

The idle test relay 240 also operates and at its preliminary make contacts 244 locks itself through its lower winding to the locking ground on conductor 184, from make contacts 146. At make contacts 241 and 242, relay 240 prepares circuits for connecting ringing signals to the called line. At make contacts 243, relay 240 connects direct ground from conductor 183 to the line test conductor, by way of break contacts 235, make contacts 283 and the connector test conductor 215. At make contacts 245, relay 240 also prepares a circuit to the ring pickup relay 180. Finally, at make contacts 246, relay 240 prepares a start circuit to the ringing interrupter. Connector relays 110, 130, 140, 240, 250, 260, 270, 280, 450 and 470 are now operated.

The fourth and last digit of the call number "2151" now causes the connector line relay 110 to release and re-operate once only. Upon the release of relay 110, the closure of the break contacts 111 sends a pulse of current over conductors 179 and 206 as before, to again cause the operation of transfer relay 290 and counting relay 310. Upon the reoperation of relay 110, the opening of the break contacts 111 opens this circuit and permits the counting control relay 310' to operate in series with the counting relay 310 as previously explained, from ground on conductor 205.

Counting control relay 310' upon operating, at make contacts 311' completes the previously mentioned alternative start circuit to the ringing machine, from ground at make contacts 266, through conductor 207, make contacts 311', and conductor 198 to the ringing generator. This circuit shunts the break contacts 175 on the ringing digit switching relay 170, thus assuring continued operation of the ringing machine when relay 170 operates. At make contacts 312', relay 310' further prepares the start circuit for the ringing interrupter. Relay 310' also, at break-make contacts 313' prepares the usual operate circuit to the second counting relay, and at make contacts 315' prepares the operate circuit of relay 170.

Transfer relay 290 now restores, after a slight interval, and at break contacts 294 and 292 completes the operating circuit to the ringing digit relay 170, which is as follows: ground from make contacts 142, conductors 166 and 203, make contacts 315', conductor 204, conductor 199 right, break contacts 294 and 292, make contacts 264 and 285, conductor 187, break contacts of the make-before-break springs 172, and the winding of relay 170 to negative battery.

The ringing digit switching relay 170 now operates, and at make contacts 172 locks itself to the grounded conductors 188 and 203. At break contacts 171, relay 170 opens the pulsing circuit to the counting relays, and at make contacts 173 connects the code conductors 194 and 195 together, preparatory to their connection to the coding relay 220. At make contacts 174, relay 170 completes the start circuit to the ringing interrupter as follows: ground at make springs 312', conductor 209, make contacts 246, conductor 196, make contacts 174, and start conductor 90 to the ringing interrupter. Relay 170 also, at break contacts 175 opens one of the start circuits to the ringing machine, and at make contacts 176 connects ground from conductor 199 to one side of the ring pickup relay 180.

When therefore, the interrupter places negative battery momentarily on the pickup lead, just before the start of the next ringing cycle, a circuit is completed for the operation of the ring pickup relay 180 as follows: ground at make contacts 142, conductors 166 and 203, make contacts 315', conductor 204, conductor 199 left, make contacts 176, break contacts 162, upper winding of pickup relay 180, conductor 189, make contacts 245, conductor 192, and the break contacts of the make-before-break springs 181 to negative battery on the pickup conductor 89. Relay 180 thereupon operates, and at make-before-break contacts 181 locks itself to steady negative battery from the interrupter on the hold battery conductor 88, and at the same time disconnects itself from the pickup conductor 89. Relay 180 also, at make contacts 182, connects conductor 193 and the coding relay 220 to the code conductors 194 and 195, and thence to the code springs of the counting relays. Since the interrupter removes negative battery from conductor 88 at the end of the code cycle, this action is repeated at each ringing cycle with the pickup relay 180 pulling up at the start of the cycle and restoring at the end of the cycle.

Ground pulses representative of the first ringing code now pass from the ringing interrupter, shown as the rectangle 92 at the lower right in Fig. 3, to the coding relay 220 through make springs 312 on the operated counting relay 310. This circuit is from ground at the coding springs of the interrupter, cable 93 and conductor 319, make contacts 312, conductor 194, make contacts 182, conductor 193 and the winding of relay 220 to negative battery. For the first code, each code cycle consists merely of one long ring of about two seconds duration followed by a silent period of about three seconds, repeated intermittently until the called party answers. This is the code employed for ringing on single party lines. The interrupter of course, also connects various combinations of long and short coding pulses to the other ringing conductors at the same time, through the cables 93 and 94, but as these circuits are all open at the springs of the other counting relays, this action is without effect in the present instance.

The coding relay 220 follows the code pulses, and on each energization connects ringing current to the called line over the following circuit: the negative "out" terminal of the ringing machine or ringing generator, the ringing conductor 91 in the upper right of Fig. 1, winding of the slow-to-operate ring-cut-off relay 190 which is shown with a copper sleeve over the core and a copper slug at the armature end, conductor 163, break contacts 212, make contacts 223, make contacts 242, talking conductor 165, break contacts 402, make contacts 452, make contacts 479, the called line negative line conductor 15', through the ringer at the called station and back over the called line positive line conductor 15, make contacts 478, make contacts 451, break contacts 401, talking conductor 158, make contacts 241, make contacts 222, and break contacts 211 to ground. The bell at the called station now rings intermittently, in the usual manner. In the case of a call to a party line, with divided ringing, this circuit of course would go directly to ground at the subscriber's ringer instead of returning over the positive line conductor. In this case also, the last digit of the call number, and consequently the ringing code, would be varied as necessary.

Relay 220 also, at each energization, at make contacts 221 completes a circuit for providing ring-back tone to the calling line. A portion of the ringing current passes back over this circuit which may be traced as follows: ringing generator, conductor 91, winding of ring-cut-off relay 190, conductor 163, the low capacity condenser 216, make contacts 221, conductor 157, conductor 135, talking condenser 109, break contacts 122, break contacts 102, negative line conductor 81, through the calling telephone, back over the positive line conductor 80, break contacts 101, break contacts 121, and the upper winding of relay 110 to ground. The ringing current is thereby made audible to the calling subscriber as a low tone, to indicate that the called line is being signalled. The ringing current itself is of course prevented from getting into the calling line by the open break contacts 222 and 223 on the one hand, and by the open make contacts 101 and 102 on the other hand.

Relay 220 also, at make contacts 224 completes an obvious circuit for operating the drain relay 200. Relay 200 therefore follows the pulsations of the coding relay 220, but due to being made slow to release by a copper slug over the core at the heel end, relay 200 remains operated for a short instant, after each release of relay 220. During this interval, at the beginning of each silent period, ground and negative battery from make contacts 201 and 202 are connected momentarily across the called line, by way of break contacts 222 and 223, make contacts 241 and 242, and the talking conductors 158 and 165. This drains the condenser charge from the line caused by the ringing, and prevents the building up of heavy voltages therein such as might otherwise occur, particularly on heavy loaded party lines. It also tends to prevent premature ring cutoff, caused by premature operation of the ring cut-off relay from the same line charge.

When the called party answers, if the receiver at the called station is lifted during a ringing period, a direct current circuit is completed thereby for the operation of the ring-cut-off relay 190, over the previously traced ringing circuit, that is from negative battery at the ringing generator, to conductor 91 and relay 190, through the called line loop and the called subscriber's telephone, and back to ground at break contacts 211. The ring-cut-off relay 190 operates over this circuit and at make contacts 191 completes a circuit to the mounting chain release relay 150. This circuit is from ground at make contacts 142, conductors 166 and 203, make contacts 315', conductor 204, conductor 199 left, make contacts 191, and the winding of relay 150 to negative battery.

The counting chain release relay 150 now operates, and at break contacts 151 opens the locking circuit to the counting relays, whereupon the relays 310 and 310' both release and restore their contacts to normal. Relay 310' upon releasing, at make contacts 311' removes ground from the ringing machine start circuit, and at make contacts 312' opens the start circuit to the ringing interrupter, thereby causing both of these devices to stop, provided they are not held operated from some other source, such as another connector, or a repeater. Relay 310' also, at make contacts 315' removes ground from conductors 204 and 199. Removal of ground from conductor 199 right, opens the operate circuit to the ringing digit relay 170, but this is without effect, as relay 170 is now locked to ground on conductors 188, 203 and 166 as previously explained. Removal of ground from conductor 199 left however, opens the circuits to both of the counting chain release relay 150 and the pickup relay 180, and both of these relays restore. Relay 180, at make contacts 182 opens the circuit to the coding relay 220, which also restores. Counting relay 310 upon releasing, at make contacts 312 further opens the circuit of the coding relay 220 by disconnecting the coding conductor 319 from conductor 194.

The coding relay 220 upon releasing, at make contacts 221 opens the ring-back circuit, and at make contacts 222 and 223 opens the ringing circuit causing relay 190 to restore. Relay 220, at make contacts 222 and 223 prepares the talking circuit, and at break contacts 224 opens the circuit to the drain relay 200. Relay 200 now also releases, after a short delay, and at break-make contacts 201 and 202 opens the line drain circuit, and connects the called line loop to the back-bridge or battery feed relay 160.

The back-bridge relay 160 now operates over the called line loop by way of the following circuit: ground through the upper winding of relay 160, conductor 159, break contacts 201 and 222, make contacts 241, conductor 158, break contacts 401, make contacts 451 and 478, line conductor 15, through the called telephone to line conductor 15', make contacts 479 and 452, break contacts 402, conductor 165, make contacts 242, break contacts 223 and 202, conductor 164, and the lower winding of relay 160 to negative battery. Relay 160 upon operating, at make contacts 161 completes a circuit for the operation of the battery reversing relay 120 from conductor 82 which is now grounded in the finder. Break-make contacts 162 are also reversed by the operation of relay 160, but without effect at this time.

The battery reversing relay 120 now operates, and locks by way of its make contacts 123 to ground at make contacts 142. Relay 120 also, at its make-before-break contacts 121 and 122, reverses ground and negative battery from relay 110 to the calling line, for metering or supervisory purposes, as required. The talking circuit through the connector is now complete, and extends from the calling telephone by way of the line conductor 80, through break contacts 101, make contacts 121, talking condenser 109, conductor 164, break contacts 202 and 223, make contacts 242, conductor 165, break contacts 402, make contacts 452 and 479, line conductor 15', the called telephone, line conductor 15, make contacts 478 and 451, break contacts 401, conductor 158, make contacts 241, break contacts 222 and 201, conductor 159, talking condenser 108, make contacts 122, break contacts 102, and line conductor 81 back to the calling telephone. Relay 110 furnishes talking battery to the calling line, and relay 160 to the called line. Connector relays 110, 120, 130, 140, 160, 170, 240, 250, 260, 270, 280, 450 and 470 are now operated.

If, instead of answering during a ringing period, the called party answers during a silent period, the action of the connector is slightly different. In this case, both the coding relay 220 and the drain relay 200 will be at normal, so that when the called party answers, the back bridge relay 160 finds itself connected to the called line loop, instead of the ring-cut-off relay 190. Relay 160 therefore operates immediately, while relay 190 remains normal. Relay 160 at make contacts 161, pulls the battery reversing relay 120 as before, and at break contacts 162 opens the circuit of pickup relay 180 which restores and prevents any further operation of relay 220. Relay 160 also, at make contacts 162 completes a circuit to the counting chain release relay 150 from ground on conductor 199 through make contacts 176 and 315'. The counting chain release relay 150 operates over this circuit and at break contacts 151 opens the locking circuit to the counting relays, whereupon the relays 310 and 310' restore. Relay 310' as before at make contacts 311' opens the ringing machine start circuit and at make contacts 312' opens the interrupter start circuit. Relay 310' also, at make contacts 315', removes ground from conductors 204 and 199, thereby causing the counting chain release relay 150 to restore. Counting relay 310 upon releasing at make contacts 312 disconnects the coding conductor 319 from conductor 194. The connector is now ready for conversation, with the talking circuit exactly as stated at the end of the preceding paragraph.

*Called line busy*

If the called line is busy, its test conductor, such as 15'' for example, will have direct ground on it from the connector through which the original connection was established. This of course, has no effect on the dialling of the first two digits of the call number, but does cause a change in the operation of the connector following the dialling of the third or units digit.

Thus, in the case of the call originally described, the subscriber line "2151," the dialling of the first digit "2" causes the operation of the preliminary digit switching and transfer relays 250 and 270 exactly as described. Likewise, the dialling of the second digit "1" causes the operation of the tens relay 470 and the tens digit transfer relay 260, precisely as before. Upon completion of this operation, connector relays 110, 130, 104, 250, 260, 270 and 470 are found operated, just as previously indicated.

Upon the dialling of the third digit "5" the counting chain counts off the dial pulses as before. On the fifth pulse, counting relay 350 operates, and on the break of the pulse when the pulsing or line relay 110 re-operates to open the pulsing circuit, the counting control relay 320' operates as before in series with relay 350, from ground on conductors 205 and 167. Transfer relay 290 operates as usual on the first pulse and releases shortly after the last pulse.

Upon the release of transfer relay 290, shortly after the fifth and last pulse, break contacts 294 and 292 of this relay close to complete the previously traced operate circuit to the units relay 450, which, to repeat, extends from ground through make contacts 142, conductor 166, conductor 203, make contacts 325', conductor 204, conductor 199 right, break contacts 294, break contacts 292, make contacts 264, break contacts 285, conductor 257, cable 227, conductor 257 in the counting relays, make contacts 355, conductor 435, and the winding of the 5–0 units relay 450 to negative battery.

The units relay 450 operates over this circuit, and connects the talking conductors 158 and 165 through to the line conductors 15 and 15' as before, by way of break contacts 401 and 402, make contacts 451 and 452, and make contacts 478 and 479. This is now without effect however, and the talking conductors remain open at make contacts 241 and 242, due to the action of the busy relay 230, whose circuit is completed at this time by the closing of make contacts 453. This circuit is from ground on conductor 15'', make contacts 480, make contacts 453, break contacts 404, the test conductor 215 in the connector, break contacts 283, conductor 169, break contacts 104, conductor 168, and the winding of relay 230 to negative battery.

Relay 450 also, at make contacts 457 again completes a circuit for the operation of the counting chain release relay 150. This circuit as before, is from ground at make contacts 146, over conductor 184, through make contacts 457, conductor 219, make contacts 273, break contacts 284, conductor 186, and the winding of relay 150 to negative battery. Finally, at make contacts 458, relay 450 prepares its own locking circuit, in series with relay 280, and at the same time shunts the latter relay to prevent its immediate operation.

Busy relay 230 and the counting chain release relay 150 operate over their respective circuits at approximately the same time, and at break contacts 151 and 233 remove ground from the locking conductor 205, thereby causing the release of the counting and counting control relays 350 and 320', which, as explained, are locked in series to this conductor.

Busy relay 230 also, at make contacts 232 locks itself to the ground on conductor 166 from make contacts 142 on the hold relay, and at make contacts 231 connects busy tone to the calling line. The busy tone circuit is from ground battery, through the secondary of the busy tone induction coil, the primary circuit of which is being interrupted in the characteristic well known manner, and thence to conductor 248 in the upper right hand corner of Fig. 2, make contacts 231, conductor 156, make contacts 141, conductor 135, talking condenser 109, break contacts 122 and 102, out over the calling loop, and back to break contacts 101 and 121, and the upper winding of relay 110 to ground. Busy tone is made audible at the calling telephone over this circuit as an indication of the busy condition. Relay 230 also, at break contacts 234 opens a point in the pulsing circuit. This is without effect in the present instance however, since break contacts 234 are now shunted by the closed make contacts 272 on the preliminary digit transfer relay. Finally, relay 230, at break contacts 236 opens a second point in the circuit of the switch-through relay 100, and at break contacts 235 opens the operate circuit of the idle test relay 240 to prevent seizure and ringing of the called line.

The counting and counting control relays 350 and 320' upon releasing, at make contacts 355 and 325' opens the operate circuit to the units relay 450. This, as previously, removes the ground shunt from the winding of the units digit transfer relay 280. Relay 280 thereupon operates as before in series with relay 450, and locks the latter relay operated, over the locking conductors 184 and 218.

The units digit transfer relay 280 upon operating, at break-make contacts 281, disconnects the units switching relay 400 from conductor 213 and the sixth counting relay, and connects the ring switching relay 210 thereto in its stead. At make contacts 282, relay 280 prepares an alternative locking circuit for the counting relays, shunting break contacts 233 on the busy relay. At break contacts 283, relay 280 opens the operate circuit of the busy relay 230, but relay 230 remains locked to hold relay ground on conductor 166. At make contacts 283, relay 280 prepares the operate circuit of the idle test relay 240, but this circuit is now open at break contacts 235 on the busy relay. Relay 280 also, at break contacts 284 opens the circuit of the counting chain release relay 150, causing the release of this relay; at make contacts 285 prepares the circuit of the ringing digit switching relay 170; and at break contacts 285 and 286 disconnects the conductors 257 and 258.

Connector relays 110, 130, 140, 230, 250, 260, 270, 280, 450 and 470 are now operated, and busy tone is on the calling line. In the majority of cases the calling party on hearing the busy tone, will hang up immediately, without dialling the final digit. Should the fourth digit be dialled however, the counting relays will follow the pulsing in the usual manner, through make contacts 272. And upon the release of transfer relay 290, the ringing digit switching relay 170 operates as before by way of break contacts 294 and 292, make contacts 264 and 285, and conductor 187. Nothing results from this however, since the open contacts 245 on the idle test relay now prevent the operation of the ring pickup relay 180, which in turn prevents closure of the circuit to the coding relay 220. Nor is there any circuit at this time for the ring-cut-off or back-bridge relays 190 and 160, nor for the counting chain release relay 150. The counting relays therefore remain operated. Upon release by the calling party, however, whether after the third or the fourth digit, all of the relays release and free the link, just as for a normal release, following a completed call.

*Digit absorption*

As stated under the heading "Numbering scheme," in the last paragraph, first digits "1," "3," "4," "5" or "6" are not used, and if dialled are absorbed. The manner in which this digit absorption occurs will now be described briefly.

Upon seizure of the connector, the connector line, release, and hold relays 110, 130 and 140 operate in the manner already described, to prepare the various operating and control circuits.

If the first digit dialled following seizure is a "1," the connector line relay 110 will release and re-operate once. On the release of relay 110, transfer relay 290 and counting relay 310 operate, and on the re-operation of relay 110, counting control relay 310' operates. Shortly thereafter, when the transfer relay 290 restores, break contacts 294 and 292 close to complete a circuit to the counting chain release relay 150, which may be traced as follows: ground at make contacts 142, conductor 166, conductor 203, make contacts 315', conductor 204, conductor 199 right, break contacts 294, 292, 264 and 275, conductor 253, cable 227, conductor 253 in the counting relays, make contacts 313, conductor 208, conductor 186 left, and the winding of relay 150 to negative battery. The same ground is also passed to conductor 254 through break contacts 265 and 276, but this circuit is now open at the springs of the counting relays. The counting chain release relay 150 operates over the first circuit, and at break contacts 151 opens the counting chain locking circuit, whereupon relays 310 and 310' release. This opens the circuit of relay 150 in turn, and this relay then also releases. The connector is still in the first digit position and dial tone is still on the calling line, through make contacts 141. If a regular call number is now dialled, the connector will respond and complete the connection, just as if the wrong first digit had not been dialled.

If the first digit dialled following seizure is a "3," relay 110 will release and re-operate three times. Relay 290 as always, operates on the first pulse and releases shortly after the last pulse. Counting relay 310 and counting control relay 310' operate on the first pulse, 320 and 320' on the second pulse, and 330 and 330' on the third pulse. Relay 290 releases as before, shortly after the last pulse, and at break contacts 294 and 292 again grounds conductors 253 and 254. Conductor 254 is again open at the springs of the counting relays, but the ground on conductor 253 passes through make contacts 333 of the third counting relay to conductor 208, and thence to relay 150 which again operates momentarily, and releases the counting chain.

Similarly, if the first digit is a "4," relay 110 will release and re-operate four times. Relay 290 as before, operates on the first pulse. Relays 310 and 310' also operate on the first pulse, 320 and 320' on the second pulse, 330 and 330' on the third pulse, and 340 and 310' again on the fourth pulse. When relay 290 releases, after the fourth pulse, break contacts 294 and 292 connect ground to conductors 253 and 254 as before. This time, conductor 253 is open at the springs of the counting relays, but the ground on conductor 254 passes through make contacts 343 of the fourth counting relay to conductor 208 and thence to relay 150. Relay 150 operates momentarily over this circuit, and releases the counting chain, as before.

If the first digit is a "5," relay 110 will release and re-operate five times, and at the end of the fifth pulse, relays 350 and 320' find themselves operated. Now when relay 290 restores after the last pulse, and grounds the conductors 253 and 254, the ground on conductor 253 passes through make contacts 353 on the fifth counting relay to conductor 208 and thence to relay 150 which releases the counting chain, as before.

Finally, if the first digit is a "6", relay 110 will release and re-operate six times. This leaves the counting and counting control relays 360 and 330' operated. When therefore relay 290 restores again after the last pulse to ground conductors 253 and 254, the ground on conductor 254 passes through make contacts 363 on the counting relay 360 to conductor 208 and relay 150.

*Release*

Release of the connection is under the control of the calling party. Thus, when the calling party replaces the receiver or handset at the end of the conversation, the opening of the calling line loop to conductors 80 and 81 opens the circuit of the connector line relay 110, which immediately releases.

Relay 110 upon releasing, opens make contacts 111 to open the circuit of the release relay 130. Relay 110 also closes break contacts 111, but this is without effect, as the connector pulsing circuit is now open at break contacts 171 of the operated ringing digit switch relay 170. The release relay 130 in response to the opening of its circuit now releases, after a short delay, and at make contacts 131 opens the circuit of the hold relay 140, which releases immediately. The opening of make contacts 131 also removes ground from the control or "C" conductor 83, thereby to permit the release of the cutoff and lockout relays in the line circuit of the calling line, and restoring said line circuit to its normal condition.

The hold relay 140 upon releasing, at make contacts 141 opens an additional point in the dial tone circuit, preparatory to the closing of break contacts 261 and 271, and at make contacts 142 opens the locking circuits of the battery reversing relay 120 and the ringing digit switching relay 170, whereupon relay 170 restores. At make contacts 147 relay 140 removes ground from the hold conductor 84 to permit the release of the finder. Removal of ground from conductor 84 also removes ground from the supervisory conductor 82 in the finder, whereupon the battery reversing relay 120 restores, to give release supervision. At make contacts 143, the hold relay 140 opens a further point in the connector pulsing circuit, and at make contacts 144 opens its own locking circuit.

Relay 140 also, at make contacts 145 opens the operate circuit to the idle test relay 240, and at make contacts 146 opens the locking circuit to relay 240, and to relays 270 and 250 in series, 260 and 470 in series, and 280 and 450 in series, whereupon all of these relays release. Upon the release of the tens and units relays 470 and 450 the called line loop is opened and the back bridge relay 160 thereupon also releases. Finally, hold relay 140, at make contacts 149 removes ground from the tone and Examiner timer start conductor 87, and at break contacts 148 prepares the operating and locking circuits to the associated link select relay in the allotter, by way of conductors 85 and 86. The link is now normal and ready to receive another call.

If the called party should hang up first, the opening of the called line loop would cause the release of the back bridge relay 160. This would be without effect however, and the connector would remain operated, over the calling line loop.

*High third and fourth digits*

If on a call to a subscriber's station, the third and fourth digits of the call number are not greater than five, that is, any digit from "1" to "5," the action of the connector will be as stated for the call just described to station "2151." If however, the third or fourth digits or both, are greater than five, the action is slightly different. In the case of a third digit higher than five, the units switching relay 400 will operate upon the dialling of this digit, together with the proper units relay, to select the high sub-group. And if the fourth digit is greater than five, the ring switch relay 210 operates on the dialling of this digit, in addition to the ringing digit switching relay 170, to direct the ringing to the positive side of the line, as in the case of party lines, where ringing may be required to either side of the line.

In the case of a call to subscriber station "2101" for example, on the dialling of the first digit "2," relays 250 and 270 operate as before, and upon the dialling of the second digit "1," the tens relay 470 and relay 260 operate, exactly as previously described.

Upon the dialling of the third digit "0," the transfer relay 290 operates momentarily as usual, and the counting relays count ten, leaving relays 300 and 310′ operated, on the completion of the last pulse. The units switching relay 400 is operated "on the run," upon the sixth step of the counting relays, when the counting relay 360 operates momentarily. Upon the operation of relay 360, its make contacts 366 complete a direct circuit to relay 400 as follows: ground at make contacts 142, conductor 166, conductor 203, make contacts 366, conductor 213 across Fig. 4 to Fig. 2, make contacts 262, break contacts 281, conductor 214, and the upper winding of relay 400 to negative battery. Relay 400 upon operating, reverses its connections to the springs of the units relays at break-make contacts 401, 402 and 404, and at make contacts 403 locks itself to hold relay ground on conductor 184.

When now the transfer relay 290 releases following the final pulse of the digit, break contacts 294 and 292 again close and connect ground through make contacts 315′ to conductors 257 and 258. This time the ground on conductor 257 encounters only open contacts in the counting relays. The ground on conductor 258 however, passes through make contacts 305 to conductor 435 and the winding of units relay 450 to negative battery.

The 5–0 units relay 450 operates over this circuit and makes connection, not to the fifth line of group 10 as before, but to the tenth line. The talking conductors 158 and 165 are connected to the line conductors 10 and 10′ by way of make contacts 401 and 402, make contacts 454 and 455, and make contacts 484 and 485. The test conductor 215 is connected to test conductor 10″ by way of make contacts 404, 456, and 486. The balance of the operation and the dialling of the fourth digit "1" is as described for the call to line "2151."

In the case of a call to subscriber station "2108," on the tenth line of group 10, which will be assumed to be a party line, the operation upon the dialling of the first three digits will be as described for a call to station "2101." That is, relays 250 and 270 operate on the first digit, 470 and 260 on the second digit, and on the third digit relays 400, 450 and 280 operate. If the line is idle, relay 240 also operates following the third digit, to seize the called line.

Upon the dialling of the fourth digit "8," the transfer relay 290 again operates, and the counting relays count eight, leaving relays 380 and 320′ operated. Upon the operation of the sixth counting relay 360, relay 210 is operated over the following circuit: ground through make contacts 142, conductors 166 and 203, make contacts 366, conductor 213 across Fig. 4 to Fig. 2, make contacts 262, make contacts 281, and the upper winding of relay 210 to negative battery. Relay 210 locks itself operated and reverses its contacts 211 and 212, thereby reversing the ringing generator and ground connections preparatory to ringing the positive side of the called line.

Upon the release of transfer relay 290 following the final pulse, the closing of break contacts 294 and 292 completes the usual circuit to relay 170 through make contacts 264, make contacts 285 and conductor 187, and relay 170 operates. Pick-up relay 180 then also operates, under control of the interrupter as previously explained, and at make contacts 182 connects the coding relay 220 to the code conductors 194 and 195.

Ground pulses representing the eighth ringing code now pass from the interrupter 92 to the coding relay 220 through the cable 94, conductor 389, make contacts 382, conductor 195, make contacts 173, make contacts 182, conductor 193, and the winding of relay 220 to negative battery. The coding relay 220 operates on each code pulse, and on each energization connects ringing current to the called line over the following circuit: negative battery through the "out" terminal of the ringing generator to conductor 91 in the upper right corner of Fig. 1, through the winding of the ring cutoff relay 190, conductor 163, make contacts 211, 222, and 241, conductor 158, make contacts 401, 454 and 484 to the positive called line conductor 10, and through the ringers of the line to ground. If the ringers are bridged, the circuit is completed over the negative line conductor 10′, through make contacts 485, 455 and 402, conductor 165, and make contacts 242, 223 and 212 to ground. The balance of the operation is already described. In the case of bridged ringers, all the ringers on the line will ring, and in the case of grounded ringers, only those connected to the side of the line being rung will operate. Relay 210 releases when the called party answers, when relays 160 and 150 operate as before, and relay 150 disconnects ground from conductor 167.

*Third digit "1"*

An examination of the control circuits through the counting relays of Fig. 3 will show that the fifth pair of springs of each pair of relays except the first is wired direct to the corresponding units relay. Thus, make springs 325 and 375 of the second and seventh counting relays are wired direct to the U2–7 units relay, make springs 335 and 385 of the third and eighth counting relays to the U3–8 units relay, make springs 345 and 395 of the fourth and ninth counting relays to the U4–9 units relay, and make springs 355 and 305 of the fifth and tenth counting relays to the U5–0 units relays 450.

In the first pair of counting relays however, the connections are a little different, and the units control is separated in the two relays. Thus, while the make springs 365 of the sixth counting relay 360 are wired direct to the U1–6 units relay 410, make springs 315 of the first counting relay 310 or wired instead to make springs on each of the tens relays, so as to control the U1–6 units relay indirectly, and give added flexibility to the arrangement. Where no trunks are associated with the first terminals of a group for example, the other side of the stated make contacts of the tens relays, such as make contacts 472, 522 and 532, would be wired to units relay 410. In the present instance however, all of the tens relays shown do serve trunk groups, and for this reason this wiring is shown dotted. Where a P. B. X trunk group is involved, the other side of the corresponding make springs on the tens relay, such as make springs 552 of tens relay 550, is wired to the units control springs of the P. B. X trunk select relays.

The resulting action, when a third digit "1" is included in a call number, may readily be seen by a brief description of a call to subscriber line "2411" for example. On the dialling of the first digit "2" the counting relays count off two steps, and operate the preliminary digit transfer relays 250 and 270. On the dialling of the second digit "4" the counting relays count off four steps and operate the group 40 tens relay, not shown, through make contacts 344 on the fourth counting relay. On the dialling of the third digit "1" the counting relays count off one step and counting relay 310 closes its make contacts 315 to operate the units relay 410, by way of conductor 431, second contacts of the group 40 tens relay, not shown, to conductor 436 and relay 410.

Except for the foregoing action on the dialling of the third digit, and the identity of the tens relays involved, the operation is identical with that described for a call to subscriber line "2151."

*Call to a private branch exchange*

On a call to a private branch exchange, seizure of the connector by the calling line operates the line, release, and hold relays 110, 130 and 140 in the connector, exactly as before. These relays prepare the connector for dialling and the hold relay returns dial tone to the calling line. Upon hearing the dial tone, the calling subscriber proceeds to dial the call number of the private branch exchange, which will be assumed to be "2511." It will also be assumed that there are seven trunks to this exchange, all having the same call number, and that all of these trunks are idle.

Upon the dialling of the first digit "2" relay 290 operates, and the counting relays count off two steps, leaving relays 320 and 320' operated. When relay 290 restores after the last pulse, break contacts 294 again connect ground from make contacts 325' to conductor 254 and thence through make contacts 323 and conductor 226 to the preliminary digit switching relay 250 which operates. Relay 250 at make contacts 251 prepares the operation of relay 270, and at make contacts 252 connects ground to relay 150, by way of break contacts 274 and 263 and conductor 186. Relay 150 operates and releases the counting relays. The release of the counting relays removes the shunt from relay 270 and this relay operates in series with relay 250, to disconnect the dial tone, release relay 150, and prepare the operate circuits required for the second digit. The action, up to this point, is exactly as described for a call to a subscriber's line.

Upon the dialling of the second digit "5," relay 290 operates and the counting relays count off five steps, leaving relays 350 and 320' operated. Now when relay 290 restores after the last pulse, break contacts 294 and 292 connect ground from make contacts 325' to conductor 255 and the tens relay 550, by way of break contacts 264, make contacts 275, conductor 255, cable 227, conductor 255 in the counting relays, make contacts 353, conductor 425, and the winding of relay 550 to negative battery.

The tens relay 550 operates over this circuit and closes its contacts, thereby connecting the various trunks and lines of the tens group to the springs of the units relays preparatory to the selection of one of their number by the subsequent action of the units relays. Relay 550 also at make contacts 552 and 564 prepares circuits to the units selecting and units switching springs associated with this connector at the P. B. X trunk selecting relays. Relay 550 also, at make contacts 554, extends its own operating ground to the tens digit transfer relay 260 by way of conductor 217, thereby shunting the latter relay and preparing its operation. Finally relay 550, at make contacts 553 completes a circuit for the counting chain release relay 150, as follows: ground at make springs 146 on the hold relay, conductor 184 across Fig. 2 and Fig. 4, make contacts 553, conductor 225 back to Fig. 2, make contacts 274, break contacts 263, conductor 186, and the winding of relay 150 to negative battery.

The counting chain release relay 150 thereupon operates, to release the counting relays, and the latter relays in turn open the operate circuit to relay 550. This removes the shunt from the tens digit transfer relay 260, and this relay operates in series with relay 550, over the following circuit: ground at make contacts 146 of the hold relay, conductor 184, winding of relay 260, conductor 217, make contacts 554, and the winding of relay 550 to negative battery. Relay 260 upon operating, releases relay 150, starts the ringing generator, and prepares to operate circuits required for the third digit.

Upon the dialling of the third digit "1," relay 290 again operates and the counting relays count off one step, again leaving relays 310 and 310' operated. When relay 290 restores shortly after the completion of the pulse, break contacts 294 and 292 again close, and connect ground from make contacts 315' to conductor 257 and the units relays, by way of the counting relays and the P. B. X trunk select relays. This circuit, from break contacts 292, passes through make contacts 264, break contacts 285, conductor 257, cable 227, conductor 257 in the counting relays, make contacts 315, conductor 431 across Fig. 4 to Fig. 5, make contacts 552, conductor 700 across Fig. 4 to Fig. 7 where, assuming all relays to be normal, it passes through break contacts 716 to conductor 701 and thence to the winding of units relay 410 and negative battery. A branch of this circuit also extends from conductor 431 through make contacts 564 to conductor 707, but this is without effect at this time due to the open make contacts 766 and 776 in the P. B. X trunk select relays.

The 1–6 units relay 410 now operates, and at make contacts 411 and 412 extends the talking conductors of the connector to the first P. B. X Examiner trunk, associated with line terminals 51 shown in the upper right corner of Fig. 5. This connection is from the talking conductors 158 and 165 in the upper left corner of Fig. 4, through break contacts 401 and 402, make contacts 411 and 412, conductors 428 and 429, and make contacts 555 and 556 to the trunk conductors 51 and 51'. Test conductor 215 at the same time is connected through break contacts 404, make contacts 413, conductor 427, and make contacts 557 to the test conductor 51'', which has negative battery on it, indicative of the idle condition of the trunk.

The units relay 410 also, at make contacts 418 extends its own operating circuit to the units digit transfer relay 280, by way of conductor 218, thereby shunting relay 280 and at the same time preparing its operation. Finally relay 410 at make contacts 417 completes a circuit for the operation of the counting chain release relay 150, which extends from ground on the conductor 184, through make contacts 417, conductor 219, make contacts 273, break contacts 284, conductor 186, and the winding of relay 150 to negative battery.

Relay 150 upon operating releases the counting relays, and the counting relays in turn open the operate circuit of the units relay. This removes the shunt from relay 280 and this relay operates in series with relay 410, from ground on conductor 184 through the winding of relay 280, conductor 218, make contacts 418, and the winding of relay 410 to negative battery. The units digit transfer relay 280 upon operating, prepares the operate circuits for the fourth and final digit, releases relay 150, and at make contacts 283 completes a circuit for the operation of the idle test relay 240. This circuit is from ground at break contacts 107, through make contacts 145, conductor 183, the upper winding of relay 240, break contacts 235, make contacts 283, test conductor 215, break contacts 404, make contacts 413, conductor 427, make contacts 557, test conductor 51'', and the line circuit of the P. B. X trunk to negative battery. Relay 240 operates over this circuit, locks to conductor 184, connects direct ground from conductor 183 to the test conductor, and at make contacts 241, 242, 245 and 246 prepares the ringing circuits.

Upon the dialling of the fourth digit "1," relay 290 operates once more and the counting relays once again count off one step, leaving relays 310 and 310' operated. When relay 290 restores following the completion of the pulse, break contacts 294 and 292 connect ground from make contacts 315' to the ringing digit switching relay 170, by way of make contacts 264 and 285, conductor 187 and break contacts 172. Relay 170 operates over this circuit and locks as before to conductor 188. Relay 170 also as before, at break contacts 171 opens the pulsing circuit, at make contacts 173 prepares circuits for the coding relay 220, and at make contacts 174 starts the interrupter from ground at make springs 312' by way of conductor 209, make contacts 246, and conductor 196. Finally, relay 170 at make contacts 176 prepares the operate circuit of the ring pickup relay 180.

The ring pickup relay 180 now operates from the next pickup pulse from the interrupter, just before the start of the next ringing cycle following the operation of relay 170. The circuit for relay 180, to repeat, is from negative battery on the pickup conductor 89, through break contacts 181, conductor 192, make contacts 245, conductor 189, winding of relay 180, break contacts 162, make contacts 176, conductors 199 and 204, make contacts 315', and conductors 203 and 166 to ground at make springs 142. Relay 180 locks as before to conductor 88 and connects the coding relay 220 to the interrupter coding conductor 319 by way of make contacts 182, conductor 194, and make contacts 312. Relay 220 follows the ground pulses impressed on the coding conductor 319 by the interrupter, and at each energization connects ringing current to the trunk at make contacts 222 and 223, as previously explained in connection with a call to a regular subscriber's line. The answering, ring cutoff, reverse battery, and release operations are also identical with those already described and will not be repeated.

Returning now to the P. B. X trunk select relays, upon the seizure of the first trunk, following the third digit of the P. B. X call number, ground from the connector on the test conductor of the trunk is extended to the trunk busy relay 710 by way of conductor 713, causing the operation of this relay. This occurs immediately after the operation of the idle test relay 240 in the connector. The trunk busy relay 710, at make contacts 711 and 712 closes obvious circuits for the operation of trunk select relays 715 and 725, by way of break contacts 767 and 721. Relay 715 at break contacts 716 disconnects the U1–6 conductor 701 from conductor 700, while relay 725, at make contacts 726 connects the U2–7 conductor 702 to the said conductor 700. Conductor 700 is open at this time however, due to the prior release of the counting relays, and this action is without immediate effect other than to prepare the seizure of the second trunk.

If the first call to the P. B. X is released before the next call is received, the release of the trunk busy relay 710, which follows the release of the trunk, will cause the release of the select relays 715 and 725. The release of these two relays restores the circuit to its original condition, with conductor 700 connected to the U1–6 conductor 701 as before, and all other units leads open. Thus the first trunk will always be employed, on successive calls to the P. B. X which are non-overlapping.

If however, the next call to the P. B. X occurs before the release of the first, ground from the counting relays on conductor 700 following the third digit is passed to the 2–7 units relay, by way of make contacts 726 and conductor 702, thereby selecting the second trunk. Upon seizure of this trunk by the connector, test conductor ground is extended to conductor 723 and the trunk busy relay 720, causing the operation of this relay. Relay 720, at break contacts 721 opens the circuit of relay 725, and at make contacts 721 closes a circuit to relay 735, through break contacts 731. Relay 725 thereupon releases and relay 735 operates, to prepare seizure of the third trunk.

A third call following immediately, will therefore cause the operation of the 3–8 units relay, over make contacts 736 and conductor 703, thereby selecting the third trunk. Seizure of this trunk causes the operation of relays 730 and 745 and the release of relay 735, to prepare seizure of the fourth trunk.

A fourth call following closely thereafter will accordingly seize the fourth trunk, through operation of the 4–9 units relay, by way of make contacts 746 and conductor 704. Upon seizure of this trunk relay 740 operates, and causes the release of relay 745 and the operation of relay 755 to prepare seizure of the fifth trunk.

Similarly, a fifth call to the P. B. X while the first four trunks are busy, will cause the operation of the 5–0 units relay, by way of make contacts 756 and conductor 705. Upon seizure of the fifth trunk, relays 750 and 765 operate and relay 755 releases. Relay 765 upon operating, at make contacts 766 connects conductor 707 to conductor 706 to prepare the operation of the connector units switching or sub-group relay 400, and at break contacts 767 opens the circuit of relay 715. Relay 715 thereupon releases, and at break contacts 716 connects conductor 700 to conductor 701 to again prepare the operation of the 1–6 units relay 410.

Upon a sixth call to the P. B. X at this time, while the first five trunks are still engaged, the units switching relay 400 and the 1–6 units relay 410 operate to seize the sixth trunk. The circuit for the units switching relay is from ground on conductor 707 through make contacts 766 and conductor 706 to negative battery through the winding of relay 400, while the circuit for the units relay is as before from ground on conductor 700 through break contacts 716 and conductor 701 to the winding of relay 410 and negative battery.

The units switching relay 400 upon operating, at make contacts 403 locks itself to hold relay ground on the locking conductor 184, and at break-make contacts 401, 402 and 404 reverses the connections to the units relays. When therefore the units relay 410 operates, at substantially the same instant, connection is made, not to the first trunk at the terminals 51 of the tens relay 550, but to the sixth trunk associated with the terminals 56. The talking conductors 158 and 165 are now connected to the trunk conductors 56 and 56′ by way of make contacts 401 and 402, make contacts 414 and 415, conductors 433 and 434, and make contacts 561 and 562. The test conductor 215 is also connected through to the test conductor 56″ by way of make contacts 404, make contacts 416, conductor 432 and make contacts 563.

The trunk busy relay 760 now operates, and at break contacts 761 opens the circuit of relay 765. Relay 765 thereupon releases and at break contacts 767 re-closes the circuit of relay 715 which re-operates. Relay 760 also, at make contacts 761 closes a circuit of relay 775 which operates. Relay 775, at make contacts 776 again connects conductors 707 and 706 to prepare the operation of the units switching relay 400. Relay 775 also, at make contacts 777 closes a circuit to relay 725 which operates to prepare the operation of the 2–7 units relay.

In the case of a seventh call to the P. B. X, with six trunks busy, the units switching relay and the 2–7 units relay will operate to seize the seventh trunk in a similar manner. Seizure of this trunk causes no further action in the trunk select relays, since the seventh busy relay is not wired up when only seven trunks are employed. Select relays 725 and 775 therefore remain operated, so that if an eighth call is attempted, with all trunks busy, the connector involved will attempt to again seize the last trunk. Due to the busy condition of this trunk however, the connector will not cut through, but will return busy tone to the calling subscribed, exactly as described for a call to a busy subscriber's line.

If trunks four and five should now become idle at the same time, relays 740 and 750 will release simultaneously, and reverse their contacts. The opening of the make contacts 741 and 751 causes the release of relay 775. Relay 775 in turn, causes the release of relay 725. The closing of break contacts 751 is without effect, but the closing of break contacts 741 completes a circuit for relay 745 which operates to again prepare the seizure of the fourth trunk.

If the second trunk next becomes idle, before the receipt of any further calls, relay 720 will release and reverse its contacts. Upon the opening of make contacts 721 relay 745 will release, and on the closing of break contacts 721, relay 725 operates, and prepares the seizure of the second trunk. If trunks three, six, and seven now release, relays 730 and 760 will restore, but without effect, due to the open make contacts 721, and the circuit remains set for trunk two. It is thus obvious that the lowest numbered idle trunk is selected, on every call.

*Call to a toll operator—group 10—digit "0"*

A call to a toll operator is made, as previously stated, by dialling the single digit "0," whereupon an idle trunk to the toll operator is selected automatically, and the called operator is signalled automatically, upon seizure of the trunk.

Upon the initiation of such a call, the connector employed in the call is seized in the usual manner through the operation of the line, release, and hold relays 110, 130, and 140. These relays again prepare the connector for dialling, and return dial tone to the calling party.

Upon the dialling of the digit "0" by the calling party, the transfer relay 290 operates on the first pulse as before, and the counting relays count off ten pulses, leaving relays 300 and 310′ operated at the completion of the tenth pulse. The operation of pulsing relay 360 and the grounding of conductor 213 through make contacts 366 on the sixth pulse, is now without effect, due to the open make contacts 262 on the tens digit transfer relay 260.

When relay 290 releases, after the completion of the tenth pulse, the closing of break contacts 294, 293 and 292 connects ground from make contacts 315′ to conductor 253, by way of break contacts 264 and 275; to conductor 254, through break contacts 265 and 276; and to conductor 259, by way of break contacts 265, 276, 277 and 293. The ground on conductor 253 encounters only open contacts in the counting relays, and is therefore without effect. The ground on conductor 254 however, passes through make contacts 303 of the tenth counting relay, conductor 491, conductor 421 right, and the winding of the tens relay 470 to negative battery. The ground on conductor 259 at the same time passes through make contacts 306 on the tenth counting relay, conductor 607 across Fig. 4 to Fig. 6, through the winding of the group access relay 610, back contacts 612, break contacts 642, break contacts 651, and the resistor 654 to negative battery. Relays 470 and 610 thereupon operate over these circuits, approximately simultaneously.

The tens relay 470 upon operating, prepares circuits to the trunks and lines of group 10 as before, and at make contacts 474 extends its operating ground to the tens digit transfer relay 260, thereby preparing the operation of this relay.

The group access relay 610 upon operating, locks itself to negative battery at its own make contacts 612, and at make contacts 613 closes an obvious circuit to lockout relay 640 which operates. Relay 640 at break contacts 642 disconnects negative battery from the other group access relays to prevent their operation at this time, and at break contacts 641 opens the circuit to the kickoff relay 650. Relay 650 is made slow to release however, and in normal operation does not have time to restore, due to the speed with which trunk selection is normally effectuated. Group access relay 610 also extends the units select leads 601, etc., to the springs of the group select relays, and at make contacts 611 completes a circuit to group select relay 660. This circuit is from ground at make contacts 611, over conductor 608, make contacts 471 of the operated tens relay in the connector, conductor 691 back to Fig. 6, and through the winding of relay 660 to negative battery.

Group select relay 660 thereupon operates, and completes the extension of the units select leads to the group 10 trunk select relays indicated by the rectangle 655, which will be assumed to control three toll trunks all of which are idle. At make contacts 669 relay 660 also extends units control ground to the rectangle 655 where it passes through springs on the first trunk select relay, back over cable 657, through make contacts 663, make contacts 615, conductor 601, cable 645, conductor 601 in the connector, and the winding of the 1–6 units relay 410 to negative battery.

Units relay 410 operates over this circuit and at make contracts 411, 412 and 413 extends the talking and test conductors of the connector to the repeater of the first toll trnnk, which is connected to line terminals 11. The talking conductors 258 and 265 for example, are connected by way of break contacts 401 and 402, make contacts 411 and 412, and make contacts 475 and 476 to the talking conductors 11 and 11', while the test conductor 215 is connected by way of break contacts 404 and make contacts 413 and 477 to the test conductor 11''.

Relay 410 also, at make contacts 418 extends its own operating ground to the units digit transfer relay 280 to prepare the operation of the latter relay, and at make contacts 417 completes a circuit for the switch-through relay 100. This circuit is from hold relay ground on conductor 184, through make contacts 417, conductor 219, break contacts 273 on the preliminary digit transfer relay, break contacts 236 on the busy relay, conductor 185, and the winding of relay 100 to negative battery.

Switch-through relay 100 now operates, and at make contacts 101 and 102 connects the calling line through to the trunk repeater, over a direct loop through the connector, which extends from the calling telephone, through the finder, conductors 80 and 81, make contacts 101 and 102, conductors 158 and 165 across Fig. 2 to Fig. 4, break contacts 401 and 402, make contacts 411 and 412, make contacts 475 and 476, and conductors 11 and 11' to the repeater. The toll repeater is seized over this circuit, signals the operator automatically, and returns ground to the connector over the test conductor 11''. At break contacts 101 and 102, relay 100 disconnects the line relay 110 from the calling line, whereupon relay 110 restores and opens the circuit of the release relay 130, which also restores, but only after a short delay, due to its slow release characteristics.

Switch-through relay 100 also, at break contacts 107 opens a point in the operating circuit of the idle-test relay 240, at break, contacts 106 removes ground from pulsing springs 111, at break contacts 104 opens the operate circuit of the busy relay, and at make contacts 105 connects holding ground from the trunk repeater to the locking springs of the hold relay 140 to prevent the release of this relay. This circuit is from ground on the test conductor 11'' through make contacts 477, make contacts 413, break contacts 404, conductor 215, conductor 177, make contacts 105, conductor 83, make contacts 144, and the winding of relay 140 to negative battery. Relay 140 therefore remains operated after the release of relay 130. Finally relay 100, at break contacts 103 removes locking ground from conductors 167 and 205 and hence from the counting relays.

The counting and counting control relays 300 and 310' thereupon release. Relay 300 upon releasing, at make contacts 303 opens the operate circuit to the tens relay 470. The shunt is thereby removed from the tens digit transfer relay 260 and this relay operates in series with relay 470, opens the dial tone circuit and locks relay 470 operated, by way of conductor 217 and make contacts 474. Relay 300 also, at make contacts 306 opens the circuit of the group access relay 610, which restores.

Group access relay 610 upon restoring, at make contacts 611 opens the circuit of the group select relay 660 which restores; at contacts 612 disconnects its own negative battery and re-connects itself to the now open break contacts 642; and at make contacts 613 opens the circuit of lockout relay 640. Relay 640 thereupon releases, at break contacts 641 re-establishes the circuit of the kick-off relay 650, in ample time to prevent the release of this relay, and at break contacts 642 again connects operate battery to the other group access relays, any of which may now be seized by another call. Finally relay 610, at make contacts 615 opens the operate circuit to the units relay 410, which removes the shunt from the units digit transfer relay 280, and this thereupon operates in series with relay 410, and locks the latter relay operated by way of conductor 218 and make contacts 418.

Because of the lock on the hold relay, the restoration of the line and release relays 110 and 130 is without effect, and the connector remains switched through, with only relays 100, 140, 260, 280, 410 and 470 operated. The talking connection to the toll operator is completed through the trunk repeater, which furnishes talking battery to the calling line, and when the operator answers, the repeater reverses this battery for supervisory or other purposes as required. Condensers 108 and 109 in the connector are disconnected at back contacts 101 and 102, while the connector ringing circuit is disconnected at the open make contacts 241 and 242.

If the first trunk is busy when such a call is initiated, the trunk select relays will cause the call to be connected to the second trunk, and if the first two trunks are busy the call will be automatically connected to the third trunk. If all trunks are busy, the trunk select relays will not complete the connection and the connector will not switch through, but will return busy tone to the calling line. This will be explained in more detail in connection with calls to inter-office trunks.

Release of the call is under the control of the calling party. When the calling party disconnects, the opening of the line loop causes the release of the trunk repeater. The release of the trunk repeater in turn removes ground from the test conductor 215. Hold relay 140 thereupon releases, and causes the release of the connector and finder.

*Inter-office calls—group 20—digit "9"*

Inter-office calls are made, as previously indicated, by dialling a single digit "9," "8," or "7" depending on the office wanted. An idle trunk to the wanted office is selected automatically, in the same manner as described for a call to a toll operator, whereupon the calling party will be connected to a manual office operator, or to an automatic office switch train, as the case may be. The chief difference between such calls and those to a toll operator lies in the use of different tens relays and different groups of trunk select relays for each class of call.

If for example the digit "9" is dialled, the call will be directed to a trunk in the 20 group, reached through the tens relay 520. Relays 110, 130 and 140 operate in the usual manner upon seizure of the connector, and when dialling begins, relay 290 operates and the counting relays count, leaving relays 390 and 330′ operated, at the end of the ninth pulse. When therefore, relay 290 releases after the last pulse, the closing of break contacts 294, 293 and 292 connects ground from make contacts 335′ to conductors 253, 254 and 259. The ground on conductor 254 now encounters only open contacts in the counting relays, and is therefore without effect. The ground on conductor 253 however, passes through make contacts 393 on the ninth counting relay, conductor 492, conductor 422 right, and the winding of the tens relay 520 to negative battery. The ground on conductor 259 likewise passes through make contacts 396 on the same counting relay, conductor 607, cable 645, and the winding of relay 610 to negative battery at make contacts 654. Relays 520 and 610 thereupon operate simultaneously.

The tens relay 520 upon operating, prepares circuits to the trunks and lines of group 20, and at make contacts 524 extends its operating ground to the tens transfer relay 260 over conductor 217. The group access relay 610 locks as before to negative battery at its own springs, operates the lockout relay 640 momentarily, and extends the units select leads to the group select relays. Relay 610 also at make contacts 611 completes a circuit for the operation of group select relay 670. This circuit is from ground at make contacts 611 over conductor 608, cable 645, conductor 608 in the connector, make contacts 521 on the operated tens relay, conductor 692, cable 645, conductor 692 in Fig. 6, and the winding of relay 670 to negative battery.

Group select relay 670 upon operating, extends the units select leads from the group access relays to the group 20 trunk select relays indicated by the rectangle 656. Relay 670 also at make contacts 679, extends units control ground to the rectangle 656, where assuming all trunks to be idle, it passes through closed springs on the first trunk select relay, back over cable 658, through make contacts 673 and 615, conductor 601, cable 645, conductor 601 again, and the winding of the units relay 410 to negative battery.

Units relay 410 operating, extends the connector talking and test conductors by way of make contacts 411, 412 and 413, conductors 429, 428 and 427, and make contacts 525, 526 and 527 to the repeater of the first trunk in the 20 group, which is connected to line terminals 21. Relay 410 also at make contacts 418 prepares the operating circuit for the units transfer relay 280, and at make contacts 417 connects ground from conductor 184 to conductor 219 and the switch-through relay 100, by way of break contacts 273 and 236, as before.

Switch-through relay 100 upon operating, at make-before-break contacts 101 and 102 disconnects the line relay 110 from the calling line and connects the calling line through to the trunk repeater direct, just as described for a toll call, with talking battery supplied from the trunk repeater. Relay 100 also, at break contacts 103 opens the locking circuit to the counting relays, at break contacts 104 disconnects the busy relay 230 from the test conductor 215, at make contacts 105 connects the hold relay 140 to the test conductor 215, at break contacts 106 disconnects ground from the pulsing circuit, and at break contacts 107 disconnects ground from the idle-test relay 240.

Relays 110, 130, 330′ and 390 now restore, but release relay 130 due to its slow release feature, remains operated long enough to permit the hold relay 140 to lock to ground placed on the test conductor 215 by the trunk repeater when the call is switched through. Relay 140 therefore remains operated, so that the release of relays 110 and 130 is without effect. Counting relay 390 upon releasing, at make contacts 393 opens the operate circuit to the tens relay 520. This removes the shunt from the winding of the tens transfer relay 260 and this relay operates in series with relay 520 and locks the latter relay operated through its make contacts 524. Relay 390 also at make contacts 396 opens the circuit of the group access relay 610 which also releases.

Group access relay 610 upon restoring, disconnects the units select leads, and at make contacts 615 therefore opens the operate circuit of the units relay 410. This removes the shunt from the winding of the units transfer relay 280, and this relay operates in series with relay 410 and locks the latter relay operated through its make contacts 418. Relay 610 also, at make contacts 611 opens the circuit to the group select relay 670 which restores; at make before break contacts 612 disconnects itself from its own negative battery and re-connects itself to the now open contacts 642; and at make contacts 613 opens the circuit of lockout relay 640. Relay 640 now also releases and at break contacts 641 reestablishes the circuit of the kickoff relay 650 which therefore remains operated. Relay 640 also, at break contacts 642, again connects operate battery through resistor 654 to the group access relays.

The connection as before, is held through the trunk repeater, which furnishes the talking battery, the talking circuit in the connector now being free of attachments. If the call is to a manual office, the repeater will signal the operator in the usual manner, but if the call is to an automatic office, further dialling will be required. In this case the additional digits will be repeated to the distant switch train by the repeater line relay.

*Inter-office calls—group 30—digit "8"*

As previously indicated, two trunk groups of three trunks each are associated with tens group 30, and may be reached by dialling the single digits "8" and "7" respectively. An idle trunk in the wanted group is selected automatically, by one of the trunk select relay groups in Fig. 9, depending on the digit dialled, and the call is switched through by connector relay 100 in the manner already described.

Thus if an "8" is dialled, the call is directed to the first group of three trunks associated with the tens relay 530, and with the upper set of trunk select relays in Fig. 9. Connector relays 110, 130 and 140 operate as before upon seizure of the connector, and relay 110 repeats the dial pulses to the counting relays. Relay 290 operates on the first pulse, and at the end of the eighth pulse, relays 380 and 320′ are left operated. The release of transfer relay 290 now connects ground through make contacts 325′ to conductors 253, 254 and 259 and the associated springs in the counting relays. The ground on conductor 253 encounters only open contacts, but the ground on conductor 254 causes the operation of tens relay 530, by way of make contacts 383, conductor 493, conductor 423 right, and the winding of relay 530 to negative battery. The ground on conductor 259 likewise causes the operation of group access relay 610, by way of make contacts 386, conductor 607, winding of relay 610, back contact 612, break contacts 642 and 651, and resistor 654 to negative battery.

Tens relay 530 upon operating prepares circuits to the trunks and lines of group 30, and at make contacts 534 extends its own operate ground to tens transfer relay 260, over conductor 217. Group access relay 610 upon operating, locks to its own negative battery, operates relay 640 momentarily to lock out the other group access relays until the call is switched through, and extends the units select leads to the group select relays. Relay 610 also at make contacts 611 causes the operation of group select relay 680, by way of conductor 608, make contacts 531, conductor 693, and the winding of relay 680 to negative battery.

Group select relay 680 upon operating, extends the units select leads by way of cable 659 to the upper set of group 30 trunk select relays in Fig. 9. Relay 680 also at make contacts 689 connects units control ground to conductor 900 and thence through cable 659 to conductor 900 in Fig. 9 where assuming all trunks to be idle, it passes through the closed make contacts 916 of the operated trunk select relay 915, conductor 901, cable 659, make contacts 683, make contacts 615, conductor 601, and the 1–6 units relay 410 to negative battery. A branch of this circuit may also be passed to a peg count meter if desired, to count the calls made to this trunk group, by way of make contacts 946 on the normally operated relay 945, and conductor 933.

Units relay 410 now operates, and at make contacts 411, 412 and 413 extends the talking and test conductors of the connector by way of conductors 429, 428 and 427, and make contacts 535, 536 and 537, to the repeater of the first trunk in the group, which is connected to line terminals 31. Relay 410 also at make contacts 418 prepares the operating circuit for the units transfer relay 280 and at make contacts 417 completes the circuit of switch-through relay 100 by way of conductor 219 and break contacts 273 and 236.

Switch-through relay 100 now operates, and at make-before-break contacts 101 and 102 disconnects the line relay 110 and connects the calling line through to the trunk repeater direct, clear of attachments. This causes seizure of the repeater, which returns talking battery and connects ground to the test conductor. Relay 100 a'so at break contacts 103 opens the locking circuit of the counting relays, and at make contacts 105 connects the hold relay 140 to the test conductor 215.

Line relay 110, release relay 130, counting control relay 320′ and counting relay 380 now restore, but hold relay 140 locks to the ground placed on the test conductor 215 by the trunk repeater, and holds the connection. The release of relays 110 and 130 is therefore without effect. Counting relay 380 however at make contacts 383 opens the operate circuit of the tens relay 530, thereby permitting the operation of the tens transfer relay 260 in series with relay 530 by way of conductor 217 and make contacts 534. Relay 380 also at make contacts 386 opens the circuit of relay 610 which also restores.

Group access relay 610 restoring, at make contacts 615 opens the operate circuit of the units relay 410, thereby permitting the operation of the units transfer relay 280 in series with 410, by way of conductor 218 and make contacts 418. Relay 610 also, at make contacts 611 opens the circuit to the group select relay 680 which restores, and at make contacts 613 opens the circuit to the lockout relay 640 which likewise restores to re-establish the circuit of relay 650 and re-connect operate battery to the group access relays.

When the call is switched through to the trunk, seizure of the trunk repeater causes the repeater to open the circuit of the normally energized trunk busy relay 910. Relay 910 thereupon releases and reverses its break-make contacts 911. This opens the operate circuit of the normally operated trunk select relay 915, from ground through back contacts 937 and 927, and completes the operate circuit of the second trunk select relay 925, from the same ground, through break contacts 937, break contacts 927, break contacts 911, make contacts 921 on the normally energized trunk busy relay 920, winding of relay 925, break contacts 942, and resistor 943 to negative battery. Relay 925 thereupon operates and at make contacts 926 connects the now ungrounded conductor 900 to the U2–7 conductor 902 to prepare the seizure of the second trunk. Relay 925 also, at make-before-break springs 927 closes a second operate circuit for itself, and opens the original operate circuit by way of break contacts 911. Finally relay 925 at make before break springs 928 completes a locking circuit for itself, and opens the locking circuit to relay 915. Trunk select relay 915 thereupon releases, at make contacts 916 disconnects conductor 900 from the U1–6 conductor 901, at make contacts 917 opens another point in its own locking circuit, and at back contacts 913 closes a point in the reset circuit.

The next call to this same trunk group will therefore cause the operation of the 2–7 units relay, not shown, by way of make contacts 926 and conductor 902, to select the second trunk, regardless of whether the first trunk is still busy or not. If for example, the first trunk is released before the next call to this group occurs, the re-operation of the trunk busy relay 910 is entirely without effect. Relay 915 cannot re-operate, due to the open back contacts 927, and relay 925 remains locked to its closed make contacts 927 and 928.

Upon seizure of the second trunk however, the repeater opens the circuit of the normally operated trunk busy relay 920, causing the release of this relay. Relay 920 upon releasing, at make contacts 921 opens the operate circuit of relay 925, but without immediate effect, and at break contacts 921 closes a circuit to the third trunk select relay 935. This circuit is from ground, through back contacts 937, make contacts 927, back contacts 921, make contacts 931, winding of relay 935, break contacts 942, and resistor 943 to negative battery. Relay 935 operates over this circuit, and at make contacts 936 connects the conductor 900 to the U3–8 units conductor 903 to prepare the seizure of the third trunk. Relay 935 also, at make-before-break springs 937 closes a second operate circuit for itself through make contacts 931, and opens its original operate circuit through make springs 927 and break springs 921. Finally relay 935, at make contacts 939 closes another point in the reset circuit, at make contacts 938 completes a locking circuit for itself, and at break contacts 938 opens the locking circuit of trunk select relay 925. Relay 925 thereupon releases, and at make contacts 926 disconnects conductor 900 from the U2–7 conductor 902. Relay 925 also, at back contacts 927 prepares the operate circuit of the first trunk select relay 915, at back contacts 928 prepares the locking circuit of relay 915, and at back contacts 929 closes an additional point in the reset circuit.

The next call to this trunk group will now cause the operation of the 3–8 units relay, not shown, in the connector, by way of make contacts 936 and conductor 903, to select the third and last trunk. If the second trunk is released before the third call is received, the release of the trunk will cause the re-operation of relay 920, but this is without effect. The open back contacts 937 prevent the re-operation of either relay 915 or relay 925 and the third call will therefore be directed to the third trunk regardless of the idle or busy condition of the first two trunks. This is rotative selection.

Upon seizure of the third trunk, the trunk repeater opens the circuit of the normally operated trunk busy relay 930, which restores. Relay 930, at make contacts 931 opens the operate circuit of select relay 935, which however, still remains locked to ground at its own make contacts 938. Relay 930 also at break contacts 931 completes a circuit for the operation of the reset relay 940, from ground at make contacts 937.

Reset relay 940 upon operating, at break contacts 941 opens the circuit to the all-trunks-busy relay 945, and at break contacts 942 opens the circuit of select relay 935. Relay 945 being made slow to release, remains operated for a moment, but relay 935 releases immediately and at make contacts 937 opens the circuit to relay 940. Relay 940, unless all trunks are still busy now releases, and at break contacts 941 re-establishes the circuit to relay 945. Relay 940 also, at break contacts 942 re-connects negative battery through resistor 943 to the trunk select relays.

If the first trunk is idle at this time, select relay 915 now re-operates, from ground through back contacts 937, back contacts 927, make contacts 911 of the re-operated trunk busy relay 910, winding of relay 915, break contacts 942, and resistor 943 to negative battery. If the first trunk is still busy but the second trunk is idle, select relay 925 will operate instead, from the same ground, through break contacts 937, 927 and 911, make contacts 921, and the winding of relay 925 to negative battery at break contacts 942.

If on the contrary, the first two trunks are still busy at the time the third call is switched through, the release of select relay 935 will establish an alternative circuit to reset relay 940 and prevent the release of this relay. This alternative circuit is from ground through break contacts 937, break contacts 927, break contacts 911, 921 and 931, and the winding of relay 940 to negative battery. The all-trunks-busy relay 945 will therefore have its circuit held open at break contacts 941 and will therefore release. Relay 945 at break-make contacts 946 opens the peg count meter circuit and prepares an overflow meter circuit; at break contacts 947 completes a circuit for the operation of an associated all trunks busy meter, by way of conductor 934; and at break contacts 948 grounds the busy conductor 909, now open in the group select relays.

If a fourth call is now attempted to this trunk group with all three trunks engaged, the eighth counting relay in the connector will cause the operation of tens relay 530, group access relay 610, and group select relay 680 as before. Relay 680 on operating grounds conductor 900 as usual, but due to the open contacts 916, 926 and 936 on the trunk select relays, no units relay operates in the connector, and the call is not switched through. The ground on conductor 900 however does pass through back contacts 946 on the all-trunks-busy relay to conductor 932 and the overflow meter, causing the latter to operate. At the same time, ground from break contacts 948 of the all-trunks-busy relay passes back over busy conductor 909, through cable 659, make contacts 688, make contacts 619, conductor 609, cable 645, conductor 609 in the connector, break contacts 283 on the unoperated units transfer relay 280, conductor 169, break contacts 104 on the unoperated switch-through relay 100, conductor 168, and the winding of the busy relay 230 to negative battery. The busy relay 230 operates over this circuit and at make contacts 231 connects busy tone to the calling line. Relay 230 also, at break contacts 234 opens the pulsing circuit, at break contacts 235 opens the circuit of the idle-test relay, and at break contacts 236 opens another point in the circuit of the switch-through relay 100. Finally relay 230 at break contacts 233 opens the locking circuit of the counting relays. Because of the unoperated condition of the units transfer relay 280 and the open contacts 282, this rupture is effective and the counting relays restore, and release the group access and group select relays.

If with idle trunks available in the called trunk group, the call is not switched through promptly following the operation of the group access and group select relays, the latter will remain operated and will fail to re-establish the circuit of the kickoff relay, thereby permitting the release of this relay. If for example the digit "8" is dialled with all trunks in the group idle and the trunk select relay 915 operated as shown, and the switch-through relay 100 fails to operate for some reason, the counting relays in the connector will not be restored, and relays 610, 640 and 680 will remain operated. After a short delay, kickoff relay 650 will therefore restore.

Kickoff relay 650 upon restoring, at break contacts 651 opens another point in the battery circuit of the group access relays, at break contacts 652 grounds the kickoff circuit and at break contacts 653 grounds the busy circuit back to the connector, by way of make contacts 619 and conductor 609. The ground from break contacts 652 causes the operation of the second select relay, by way of make contacts 681, conductor 908, cable 659, conductor 908 in Fig. 9, make contacts 918, make contacts 921, winding of relay 925, and through break contacts 942 to negative battery. Relay 925 upon operating over this circuit prepares the selection of the second trunk and releases select relay 915.

The busy relay 230 also operates, from the ground on conductor 609, and again gives the busy signal to the calling party. Relay 230 also as before, at break contacts 233 causes the release of the counting relays. This again causes the release of relays 610, 640 and 680, and the re-operation of relay 650. A repetition of the call will therefore now be directed to the second trunk and if the same failure occurs the select relays will be kicked over to the third trunk and so on.

*Inter-office calls—group 30—digit "7"*

If with the arrangement shown in the drawings, the digit "7" is dialled, the call is directed to the second group of trunks associated with the tens relay 30, and with the lower set of trunk select relays in Fig. 9, by way of the trunk access relays of Fig. 8.

Upon seizure of the connector, relays 110, 130 and 140 operate in the usual manner, and relay 110 passes the impulses to the counting relays. Relay 290 operates on the first pulse, and at the end of the seventh pulse, relays 370 and 310' remain operated. The release of relay 290 now connects ground from make contacts 315' to conductors 253, 254 and 259 as before. The ground on conductor 254 now encounters only open contacts on the counting relays, but the ground on conductor 253 causes the operation of tens relay 530, by way of make contacts 373, conductor 493, conductor 423 right, and the winding of relay 530 to negative battery. The ground on conductor 259 this time causes the operation of trunk access relay 810, by way of make contacts 376, conductor 807, cable 645, conductor 807 in Fig. 8, winding of relay 810, break contacts 841, make contacts 851, and the resistor 854 to negative battery.

Tens relay 530 upon operating, prepares circuits to the trunks and lines of group 30 as before, and at make contacts 534 prepares the operating circuit of the tens transfer relay 260. Trunk access relay 810 upon operating, locks to negative battery at its own make springs 811, extends the units select leads from the connector direct to the second set of trunk select relays in Fig. 9, and at make contacts 812 completes an obvious circuit for the operation of the lockout relay 840.

Lockout relay 840 now also operates, and at break contacts 841 disconnects the common negative battery from the trunk access relays to prevent the operation of any other of these relays at this time. Relay 840 also, at break contacts 842 momentarily opens the circuit of the normally operated kickoff relay 850, and at make contacts 843 completes a circuit for the operation of the selected units relay in the connector. This circuit is from ground, through make contacts 843, conductor 990, cable 859, and conductor 990 in the lower trunk select relays, where it branches and goes on to the connector over two paths. Assuming all trunks to be idle at this time, the first of these paths is through make contacts 956 of the normally operated select relay 955, conductor 991, cable 859, conductor 991 in Fig. 8, make contacts 815, conductor 601, cable 645, conductor 601 in Fig. 4, and the winding of the 1–6 units relay 410 to negative battery. The second path is through make contacts 956', conductor 996, cable 859, conductor 996 in Fig. 8, make contacts 814, conductor 606, cable 645, conductor 606 in Fig. 4, and the upper winding of the units switching relay 400 to negative battery.

Units switching relay 400 and units relay 410 operate substantially simultaneously over these circuits. Relay 400 upon operating, locks itself through make contacts 403 to hold relay ground on conductor 184, and at break-make contacts 401, 402 and 403 reverses the line connections at the springs of the units relays. Units relay 410 upon operating, extends the talking and test conductors of the connector by way of make contacts 414, 415 and 416, conductors 434, 433 and 432, and make contacts 541, 542 and 543 on the operated tens relay 530 to the first trunk of the second trunk group, which trunk is connected to line terminals 36. Relay 410 also, at make contacts 418 prepares the operating circuit for units transfer relay 280, and at make contacts 217 completes the circuit of switch-through relay 100, by way of conductor 219, break contacts 273 on the preliminary digit transfer relay, and break contacts 236 on the busy relay.

Switch-through relay 100 thereupon operates as before and at contacts 101 and 102 disconnects relay 110 and switches the calling line through to the trunk. This causes seizure of the trunk repeater over the calling loop, and the repeater thereupon connects talking battery to the line, and grounds the test conductor. Relay 100 also at contacts 103 opens the locking circuit to the counting relays, and at contacts 105 connects hold relay 140 to the test conductor.

Line relay 110, release relay 130, counting control relay 310', and counting relay 370 now restore, but hold relay 140 locks to the ground on the test conductor and holds the connection. Counting relay 370, at make contacts 373 opens the operate circuit to the tens relay 530, whereupon tens transfer relay 260 operates in series with 530 and locks the latter operated. Relay 370 also at make contacts 376 opens the circuit to trunk access relay 810, which restores.

Trunk access relay 810 upon releasing, at make contacts 815 opens the operate circuit to the units relay 410, whereupon units transfer relay 280 operates in series with relay 410, and locks the latter operated. Relay 810 also, at make contacts 812 opens the circuit of the lockout relay 840. Relay 840 now restores, re-establishes the circuit of the kickoff relay 850, and re-connects the common negative battery to the trunk access relays, thereby placing these relays in readiness to handle another call, either from the same connector or from a different connector. Finally relay 840 at make contacts 843 removes ground from conductor 990, and hence from the units select springs of the associated trunk select relays.

Upon seizure of the trunk repeater the associated trunk busy relay 950 is released and the trunk select relays function to pre-select the next idle trunk. The operation of these trunk select relays on subsequent calls, is identical with that described for the upper set of trunk select relays and will not be repeated.

The invention having now been described, what is believed to be new, and for which the protection of Letters Patent is desired, will be pointed out in the appended claims.

What is claimed is:

1. In a telephone system, a plurality of relay type connectors, a plurality of trunk groups accessible to said connectors and having the single digit call numbers "0," "9," "8" and "7" respectively, a plurality of trunk groups accessible to said connectors and having four-digit call numbers, a plurality of subscribers lines accessible to said connectors and having four-digit call numbers, from one to ten trunks in each of said trunk groups, and means for extending calls to at least two of said single-digit trunk groups, to one or more of said four-digit trunk groups, and to one or more of said subscribers lines simultaneously.

2. In a telephone system, a plurality of relay type connectors, a plurality of trunk groups having single-digit call numbers, a plurality of trunk groups having four-digit call numbers, means for including up to ten trunks in said four-digit trunk groups and in at least some of said single-digit trunk groups, means for completing calls simultaneously through said connectors to at least two of said single-digit trunk groups and to any of said four-digit trunk groups, and trunk selecting equipment common to said connectors for automatically directing such calls to a pre-selected idle trunk in each called trunk group.

3. In a telephone system, a plurality of relay type connectors, group and sub-group relays in said connectors, a plurality of trunk groups having single-digit call numbers, a plurality of trunk groups having four-digit call numbers, means for including as many as ten trunks in said four-digit trunk groups and in at least one of said single-digit trunk groups, means for completing calls through said connectors and the contacts of said group and sub-group relays to at least two of said single-digit trunk groups and to any of said four-digit trunk groups simultaneously, trunk selecting equipment common to said connectors for directing calls for said single-digit trunk groups to pre-selected idle trunks in said groups on a rotation basis, and other trunk selecting equipment common to said connectors for directing calls for said four-digit trunk groups to pre-selected idle trunks in said groups on a non-rotation basis.

4. In a telephone system, a plurality of relay type connector switches, group, units and sub-group relays in said connectors, a plurality of trunk groups each having a different single-digit call number, a plurality of trunk groups having four-digit call numbers, means for including up to ten trunks in said four-digit trunk groups and in at least one of said single digit trunk groups, means for completing calls through said connectors and the contacts of said relays to at least two of said single-digit trunk groups and at least two of said four-digit trunk groups simultaneously, trunk selecting means common to said connectors for directing calls for said trunk groups to pre-selected idle trunks in said trunk groups, means in said connectors responsive to the dialing of the proper single-digit call numbers for seizing the appropriate trunk selecting equipment, and means for immediately releasing said trunk selecting equipment after the extension of the call has been completed.

5. In an automatic telephone exchange, a plurality of relay type connectors, group relays, units relays and a sub-group relay in each connector, contacts on said relays, a plurality of trunk groups, each of said trunk groups associated with a different one of said group relays and each trunk group having an individual single-digit call number, another trunk group also associated with a particular one of said group relays and having a different single digit call number, means responsive to the simultaneous dialing of the call number of said other trunk group and the call number of any one of said plurality of trunk groups for extending calls through said connectors and the contacts of said relays to said other trunk group and the corresponding dialled one of said plurality of trunk groups simultaneously, trunk selecting equipment common to said connectors for directing calls for said trunk groups to pre-selected idle trunks in said trunk groups, means for seizing said equipment to complete the extension of a call, means for immediately releasing said equipment after the extension of the call has been completed, and means for also releasing said equipment and for returning busy tone to the calling subscriber in cases where said extension is not completed promptly.

6. In an automatic telephone system, a plurality of relay type connectors, group relays and sub-group relays, contacts on said relays, a plurality of trunk groups each connected to contacts of a different one of said group relays and having separate single-digit call numbers, another trunk group also connected to contacts of one of said different group relays and having a single-digit call number different from those of the other trunk groups, means for extending calls through said connectors and the contacts of said relays to said other trunk group and any one of said plurality of trunk groups simultaneously, trunk selecting equipment common to said connectors for directing calls from said trunk groups to pre-selected idle trunks in said trunk groups, means for seizing said equipment from a connector to complete the extension of a call, means for releasing the associated selecting equipment immediately the extension of a call has been completed, means for also releasing said associated equipment and giving a busy signal to the calling party in cases where said extension is not completed promptly, and means for also causing said trunk selecting equipment to pre-select the next succeeding idle trunk whenever said extension is not completed promptly.

7. In an automatic telephone system, a plurality of relay type connectors, group and units and sub-group relays in said connectors, contacts on said relays, first and second trunk groups, both of said trunk groups connected to contacts on the same group relay in each connector and each trunk group having a different single-digit call number, means responsive to the simultaneous dialing of said call numbers for extending calls through said connectors and the contacts of said relays to both of said trunk groups simultaneously, trunk selecting equipment for directing such calls to pre-selected idle trunks in said trunk groups, means for seizing a portion of said equipment on each such call to complete the extension of the call, means for freeing the associated selecting equipment immediately after the extension of a call has been completed, means operative when all trunks in the called trunk group are busy for preventing the completion of the call and freeing said associated selecting equipment automatically, and automatic means in said selecting equipment for freeing said associated selecting equipment in cases where idle trunks are available in the called trunk group but the extension of the call is not completed promptly.

8. In an automatic telephone system, a plurality of relay type connectors, group and sub-group relays in said connectors, contacts on said relays, a plurality of trunk groups connected to contacts on the same group relay in each connector and each trunk group having a different single-digit call number, counting relays in said connectors, means including said counting relays operative in response to the simultaneous dialing of said call numbers for extending calls through said connectors and the contacts of said relays to each of said trunk groups simultaneously, trunk selecting equipment common to said connectors for pre-selecting idle trunks in said trunk groups, means for seizing a portion of said trunk selecting equipment on each such call to complete the extension of the call to a pre-selected idle trunk, means for releasing the associated selecting equipment immediately after the extension of a call has been completed, means in said selecting equipment operative when all trunks in the called group are busy to cause said associated equipment to be released promptly and to cause a busy signal to be given to the calling party, and means in said selecting equipment operative when a trunk call is not disposed of promptly to cause the automatic release of said associated equipment and to cause a busy signal to be given to the calling party.

9. In a telephone system, a plurality of automatic relay type connectors, group relays, units relays and a sub-group relay in each connector, contacts on said relays, a plurality of trunk groups each having an individual single-digit call number and each connected to the contacts of a different group relay, another trunk group having a different single-digit call number and connected to other contacts on one of said group relays to which one of said first named trunk groups is connected, means responsive to the dialing of the proper call numbers for operating said relays and for extending calls through the contacts of said relays to said second named trunk group and any one of said first named trunk groups simultaneously, trunk selecting means common to said connectors and including a set of trunk select relays for each trunk group for directing said trunk calls to pre-selected idle trunks in said trunk groups, means for freeing the associated trunk selecting equipment immediately after the extension of a call has been completed, and means for causing the associated trunk selecting relays to prepare the selection of the next idle trunk and cause a busy signal to be returned to the calling party in cases where said extension is not completed promptly.

10. In a telephone system, a plurality of relay type connectors, tens relays, units relays and a sub-group relay in each connector, contacts on said relays, a plurality of trunk groups each connected to contacts of different ones of said tens relays and having different single-digit call numbers, another trunk group also connected to contacts of one of said different ones of said tens relays and having a still different single-digit call number, a trunk group connected to contacts of a still different one of said tens relays and having a four-digit call number, up to ten trunks being connected to each of said trunk associated tens relays, means for extending calls through the contacts of said tens, units and sub-group relays to one of said first named single-digit trunk groups, to said second named single-digit trunk group, and to said four-digit trunk group simultaneously, trunk selecting means common to said connectors for causing said trunk calls to be extended to pre-selected idle trunks in said trunk groups, and means for giving a busy signal to the calling party in case no idle trunks are available in a called trunk group.

11. In a telephone system, a relay type connector, group relays in said connector, contacts on said group relays sufficient for serving ten lines or trunks, a sub-group relay in said connector for dividing the contacts of said group relays into two sub-groups, trunk groups connects to contacts of either sub-group on certain of said group relays one trunk group per relay, another trunk group connected to other contacts on one of said certain group relays, each of said trunk groups having a single-digit call number different for each trunk group, another similar connector, means responsive to the dialing of the proper single digit call numbers for extending calls through said connectors and through the contacts of said relays in said connectors to said last named trunk group and to one of said first named trunk groups simultaneously, a set of trunk select relays individual to each trunk group and common to said connectors, means including said trunk select relays for directing such calls to a pre-selected idle trunk in the called trunk group and in either sub-group, means for pre-selecting said trunks in rotation, on all trunks busy meter, means for operating said all trunks busy meter whenever all trunks in a trunk group are engaged, and means for giving a busy signal to the calling party whenever a call is attempted to a trunk group in which all trunks are engaged.

12. In a telephone system, two relay type connectors, group relays, contacts on said relays, sub-group relays for dividing the contacts of each said group relay into two sub-groups, trunk groups connected to contacts of either or both sub-groups on certain of said group relays one trunk group per relay, an additional trunk group connected to other contacts on one of said certain relays, each trunk group having a single-digit call number which is different for each trunk group, means responsive to the dialing of the proper single-digit call numbers for extending calls through said connectors and the contacts of said relays to said additional trunk group and to any one of said first named trunk groups simultaneously, a set of trunk select relays individual to each of said trunk groups and common to said connectors, means including said trunk select relays for directing such calls to a pre-selected idle trunk in the called trunk group and in either sub-group, an overflow meter connected to at least one of said sets of select relays, and means for operating said overflow meter and for giving a busy signal to the calling party whenever a call is attempted to a trunk group in which all trunks are busy.

13. In a telephone system, two relay type connectors, group and units relays, contacts on said relays, sub-group relays serving to divide the contacts of said group and units relays into two sub-groups, trunk groups connected to contacts of either sub-group on certain of said group relays one trunk group per relay, an additional trunk group connected to other contacts on one of said certain relays, each trunk group having a single-digit call number which is different for each trunk group, means responsive to the dialing of said single-digit call numbers for extending calls through said connectors and the contacts of said relays to said additional trunk group and any one of said first named trunk groups simultaneously, a set of trunk select relays individual to each of said trunk groups and common to said connectors, means including said trunk select relays for directing calls to said trunk groups to a pre-selected idle trunk in the called trunk group, means for associating a peg-count meter, an all-trunks-busy meter and an overflow meter to any of said sets of select relays, and means controlled by said relay sets for operating said peg-count meter on each call to the associated group, for operating said all-trunks-busy meter when all of the associated trunks are busy, and for operating said overflow meter when a call is attempted to the associated trunk group while all trunks in said group are busy.

14. In an automatic telephone system, two relay type switches, group and units relays in each switch, contacts on said relays, a sub-group relay in each switch for dividing the contacts of said group and units relays into two sub-groups, a plurality of trunk groups connected to contacts on certain of said group relays one trunk group per relay, an additional trunk group connected to other contacts on one of said certain relays, separate single-digit call numbers being assigned to each of said trunk groups, means responsive to the dialing of said call numbers for extending calls through said switches and the contacts of said relays to said additional trunk and to one of said first named trunk groups simultaneously, trunk selecting equipment common to said switches and including a set of trunk select relays for each trunk group, means for seizing a portion of said trunk selecting equipment on each trunk call to complete the extension of the call to a pre-selected idle trunk in the called trunk group, means for freeing said portion of said equipment as soon as said extension has been completed, means in said selecting equipment to cause the freeing of said portion of said equipment and the giving of a busy signal when all trunks in the called trunk group are busy, means for associating an all-trunks-busy meter and an overflow meter to any of said sets of trunk select relays, and means in said trunk selecting equipment for operating said meters.

15. In a telephone system, an automatic relay connector, group and units relays in said connector, contacts on said relays, a plurality of trunk groups associated with said connector and having separate single-digit call numbers, trunk selecting equipment associated with said connector including a group access relay, a group select relay for each trunk group, and a set of trunk select relays accessible to each group select relay, means responsive to the dialing of any of said single-digit call numbers to operate said group access relay and one of said connector group relays substantially simultaneously, means controlled by said operated group access and connector group relays to operate one of said group select relays, means on said operated group select relay to pass a potential to the associated set of trunk select relays, and contacts on said trunk select relays and on said operated group select and group access relays for passing said potential back to the connector to operate one of said units relays and complete the extension of the call through said connector and the contacts of said operated group and unit relays to a pre-selected idle trunk in the called trunk group.

16. In a telephone system, an automatic relay connector, group and units relays in said connector, contacts on said relays, a sub-group relay in said connector serving to divide the contacts of said relays into two sub-groups, a plurality of trunk groups each connected to contacts of different ones of said group relays and having different single digit call numbers, trunk selecting equipment associated with said connector including a group access relay, a group select relay for each trunk group and a set of trunk select relays for each trunk group, counting relays in said connector operated responsive to the dialing of any of said single-digit call numbers to operate said group access relay any one of said group relays substantially simultaneously, contacts operated in response to the operation of said group access and group relays to operate one of said group select relays, means on said operated group select relay to pass potential to the associated trunk select relays, contacts on said trunk select relays and on said operated group select and group access relays for passing said potential back to the connector to operate one of said units relays and complete the extension of the call through the contacts of said group and units and sub-group relays to a pre-selected idle trunk in the called trunk group associated with either sub-group of contacts, and means for pre-selecting said idle trunks in rotation.

17. In a telephone system, two automatic relay connectors, group and units relays in said connectors, contacts on said relays, a plurality of trunk groups each connected to contacts of different ones of said group relays in each connector and having different single-digit call numbers, trunk selecting equipment associated with said connectors and including a group access relay for each connector, a group select relay for each said trunk group and a set of trunk select relays for each said trunk group, means in each connector responsive to the dialing of any of said single-digit call numbers to operate the associated group access relay and one of said group relays in said connector substantially simultaneously, a circuit completed by said operated group access and group relays to operate the group select relay associated with the called trunk group from a potential supplied by said operated group access relay, and a circuit completed by said operated group access and group select relays and one of the trunk select relays in the associated set of trunk select relays to operate one of said units relays in said connector from a potential supplied by said operated group select relay.

18. In a telephone system, two automatic relay connectors, group and units relays in said connectors, contacts on said relays, a plurality of trunk groups each connected to contacts of different ones of said group relays in each connector and having different single digit call numbers, trunk selecting equipment associated with said connectors and including a group access relay for each connector, a group select relay for each said trunk group, and a set of trunk select relays for each said trunk group, means in each connector responsive to the dialing of any of said single-digit call numbers to operate the group access relay associated with said connector and one of the group relays in said connector, a circuit completed by said operated group access and group relays to operate the group select relay associated with the called trunk group, a circuit completed by said operated group select and group access relays and one of the trunk select relays in the set of trunk select relays associated with said trunk group to operate a pre-selected one of said units relays in said connector; another trunk group connected to other contacts on corresponding ones of the group relays in said connectors to which one of said first named trunk groups is connected, said trunk group also having a single-digit call number different from that of any of said first named trunk groups, other trunk selecting equipment common to said connectors and including a trunk access relay for each connector and a single set of trunk select relays, means in each connector responsive to the dialing of the appropriate single-digit call number to operate the associated trunk access relay and one Examin of said group relays in said connector, means on said operated trunk access relay to pass a potential to the associated set of trunk select relays, and contacts on said last named trunk select relays and said operated trunk access relay for passing said potential back to said connector to operate one of said units relays in said connector.

19. In a relay automatic exchange, a plurality of connectors each including group and units relays, groups of lines accessible to said connectors through contacts of said relays one of said groups including a group of trunk lines, units control conductors corresponding to and connected to said units relays, trunk selecting apparatus common to said connectors, marking conductors in said common trunk selecting apparatus corresponding to said units control conductors, means in said common apparatus for pre-selecting one of said marking conductors corresponding to an idle trunk in said trunk group, means in each connector responsive to the dialing of a digit designating said trunk group for operating the corresponding group relay in the connector in use, means for connecting said control conductors to corresponding ones of said marking conductors in response to the dialing of said digits designating said trunk group, and means in said common apparatus responsive to the operation of said group relay for connecting an operating potential to said pre-selected marking conductor to operate the corresponding units relay over the connected control conductor.

JOHN H. VOSS.

No references cited.